United States Patent
Fukui et al.

(10) Patent No.: US 6,961,629 B2
(45) Date of Patent: Nov. 1, 2005

(54) OUTPUT SERVICE PROVIDING SYSTEM THAT UPDATES INFORMATION BASED ON POSITIONAL INFORMATION, TERMINAL, AND METHOD OF PROVIDING OUTPUT SERVICE

(75) Inventors: Yoshiki Fukui, Suwa (JP); Shinya Taniguchi, Suwa (JP); Naruhide Kitada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 402 days.

(21) Appl. No.: 10/245,576

(22) Filed: Sep. 18, 2002

(65) Prior Publication Data

US 2004/0051744 A1 Mar. 18, 2004

(51) Int. Cl.[7] .............................................. G05B 19/18
(52) U.S. Cl. ............................ 700/65; 700/19; 700/20; 700/66; 700/56; 700/69; 345/418; 345/419; 345/420
(58) Field of Search ............................ 700/18, 19, 20, 700/17, 83–86, 65–66, 56, 69, 70; 345/418, 419, 420

(56) References Cited

U.S. PATENT DOCUMENTS

| | | | | |
|---|---|---|---|---|
| 6,389,153 B1 | * | 5/2002 | Imai et al. | 382/106 |
| 6,674,534 B2 | * | 1/2004 | Norita et al. | 356/601 |
| 6,720,949 B1 | * | 4/2004 | Pryor et al. | 345/158 |
| 2004/0054430 A1 | * | 3/2004 | Taniguchi et al. | 700/83 |

FOREIGN PATENT DOCUMENTS

| | | |
|---|---|---|
| JP | A 10-13720 | 1/1998 |
| JP | A 2000-152125 | 5/2000 |
| JP | A 2001-25075 | 1/2001 |
| JP | A 2001-142825 | 5/2001 |
| JP | A 2001-147755 | 5/2001 |

* cited by examiner

*Primary Examiner*—Ramesh Patel
(74) *Attorney, Agent, or Firm*—Oliff & Berridge, PLC

(57) ABSTRACT

This invention provides an output service provision system which is capable of allowing a user to easily receive a provided output service, providing an output service responsive to the user and flexibly coping with situational variations.

Upon determining that a virtual object B is in an area-in state with respect to a virtual object A, a virtual object management device can transmits an area-in notification to a projector. Upon receiving the area-in notification, the projector can transmits a projector display data transmission request to a portable terminal and receives projector display data transmitted in response to the transmission request. The projector can then executes a projection process by a projection device on the basis of the received projector display data. The portable terminal can transmits the projector display data to the projector in response to the projector display data transmission request.

20 Claims, 20 Drawing Sheets

[FIG. 1]
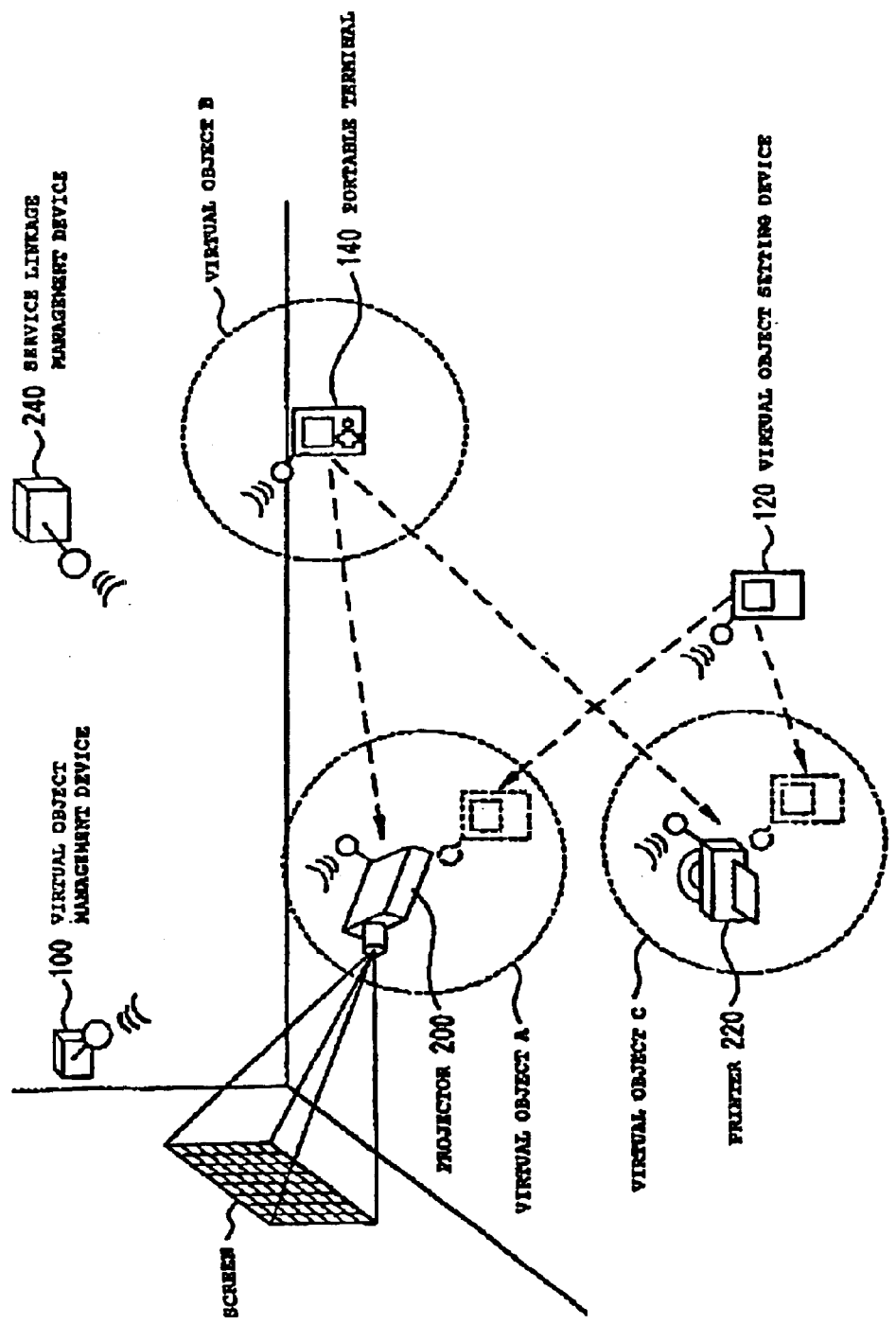

[FIG. 2]
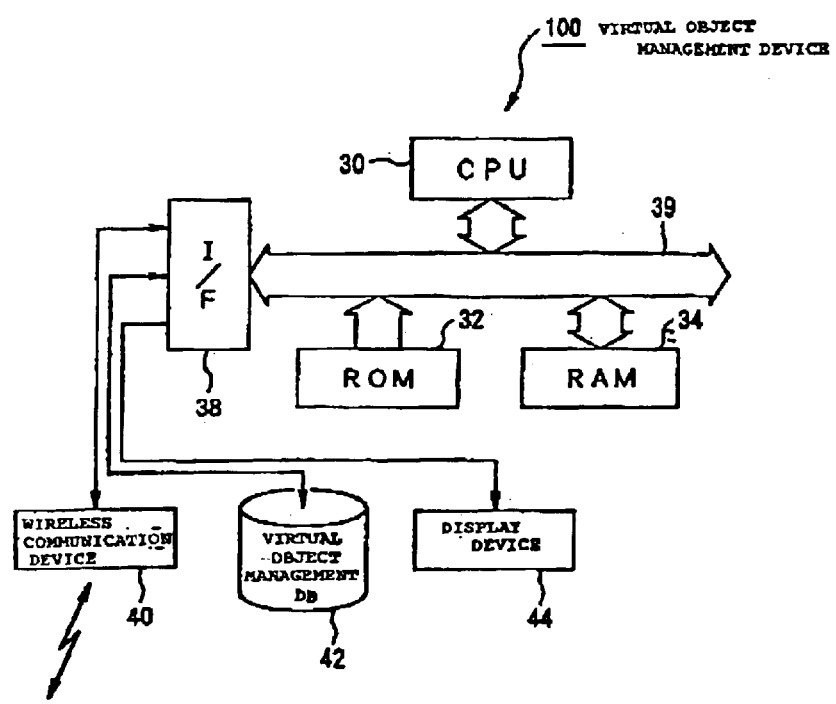

[FIG. 3]

400 VIRTUAL OBJECT MANAGEMENT TABLE

| 402 | 404 | 406 | 408 | 410 | 412 | 414 |
|---|---|---|---|---|---|---|
| SERIAL NUMBER | SERVICE TYPE | SERVICE ID | ORIGIN (x,y,z) | SHAPE | RANGE (m) | AREA-IN MANAGEMENT INFORMATION (Ex. 0001, 0002,...) |
| 1 | PROJECTOR SERVICE | 0001 | 10,50,20 | SPHERE | 2 | |
| 2 | PDA SERVICE 1 | 0002 | 20,30,20 | SPHERE | 2 | |
| 3 | PDA SERVICE 2 | 0003 | 30,40,20 | SPHERE | 1 | 0001 |
| 4 | PRINTER SERVICE | 0004 | 30,40,20 | SPHERE | 2 | |

Columns 402–406: SERVICE INFORMATION
Columns 408–414: OBJECT INFORMATION

[FIG. 4]

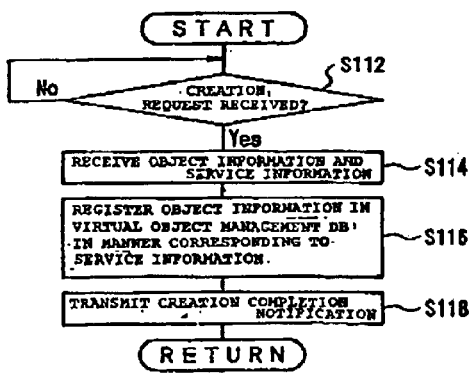

500 COMMUNICATION INFORMATION REGISTRATION TABLE

| SERVICE ID | SERVICE TYPE | COMMUNICATION INFORMATION |
|---|---|---|
| 0001 | PROJECTOR SERVICE | COMMUNICATION OBJECT DATA A |
| 0002 | PDA SERVICE 1 | COMMUNICATION OBJECT DATA B |
| 0003 | PDA SERVICE 2 | COMMUNICATION OBJECT DATA C |
| 0004 | PRINTER SERVICE | COMMUNICATION OBJECT DATA D |

[FIG. 5]

START
↓
S112: CREATION REQUEST RECEIVED? — No (loop)
↓ Yes
S114: RECEIVE OBJECT INFORMATION AND SERVICE INFORMATION
↓
S116: REGISTER OBJECT INFORMATION IN VIRTUAL OBJECT MANAGEMENT DB IN MANNER CORRESPONDING TO SERVICE INFORMATION
↓
S118: TRANSMIT CREATION COMPLETION NOTIFICATION
↓
RETURN

[FIG. 6]
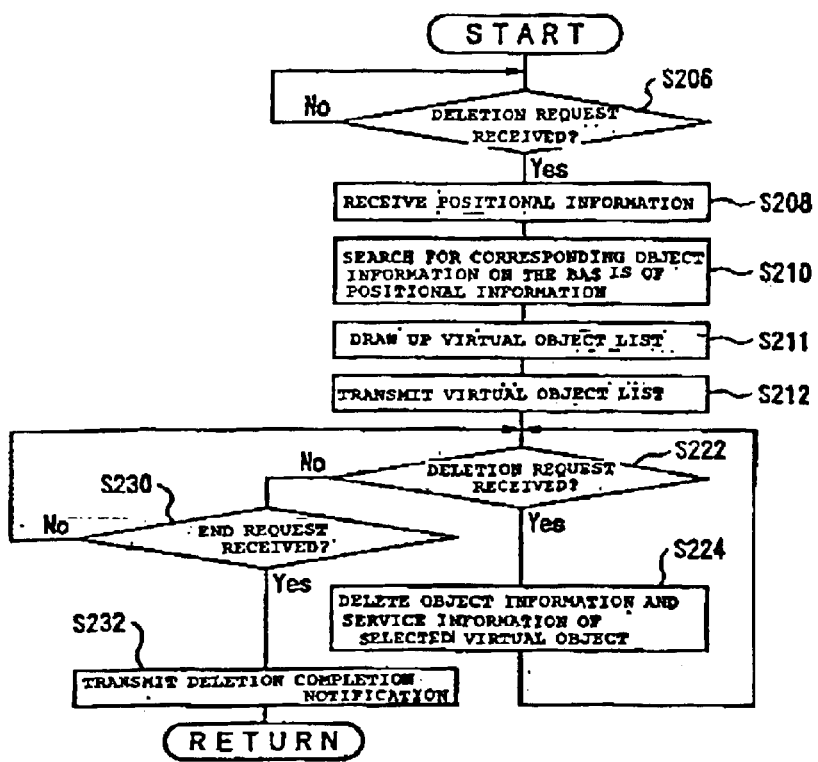

[FIG. 7]
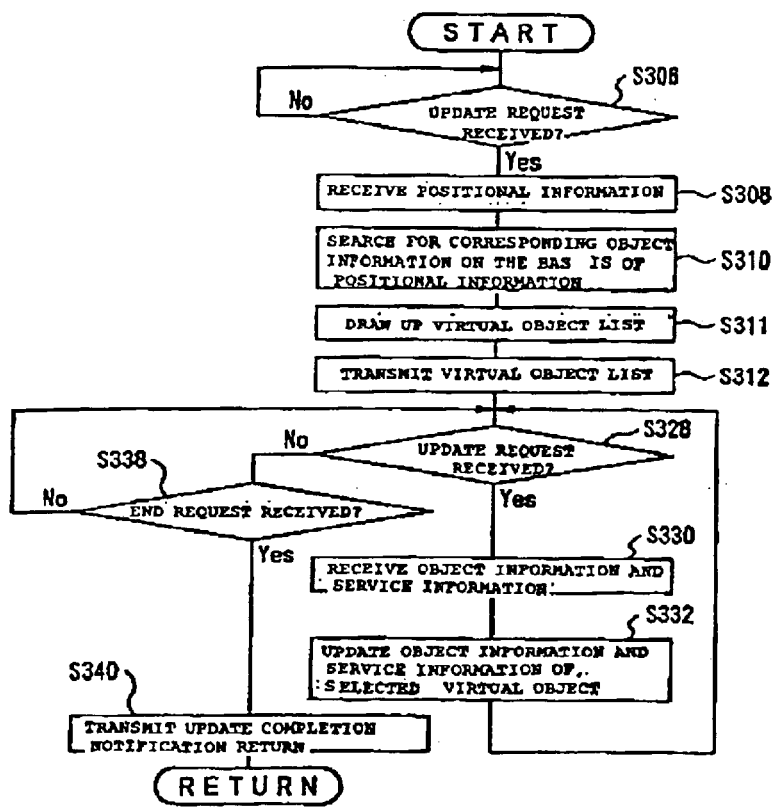

[FIG. 8]
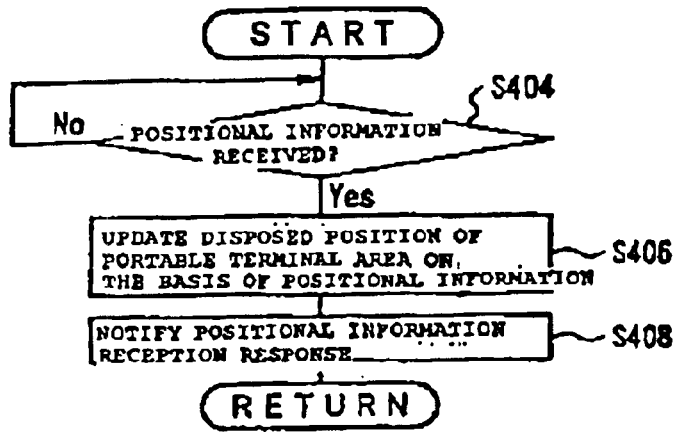
[FIG. 9]
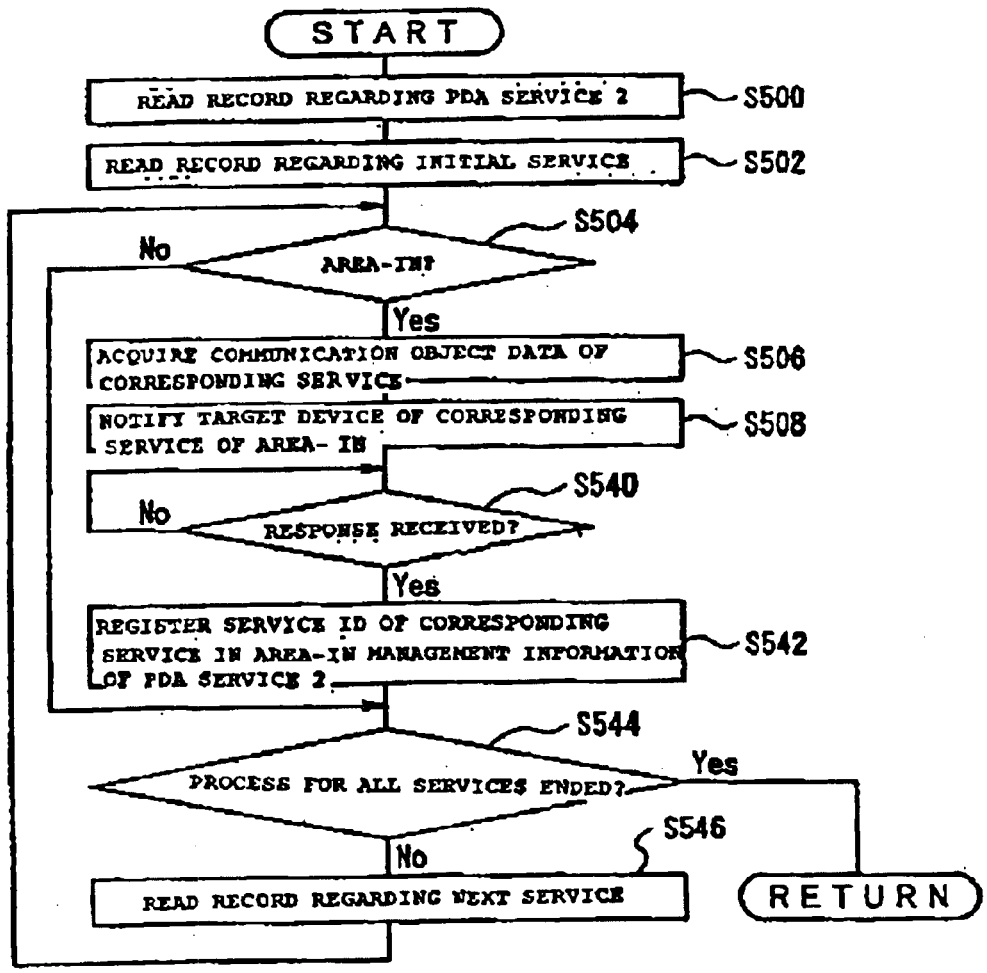

[FIG. 10]
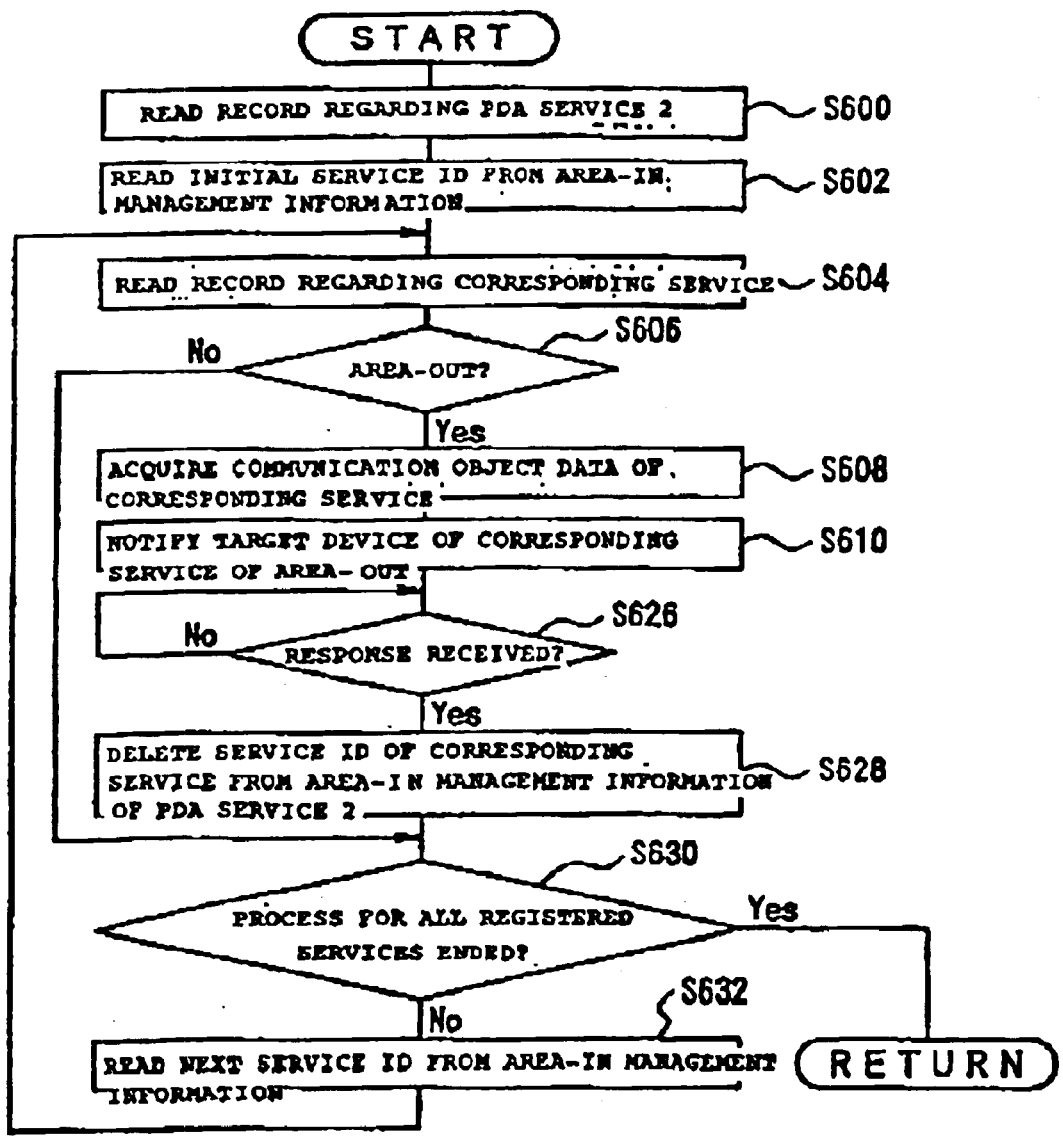

[FIG. 11]
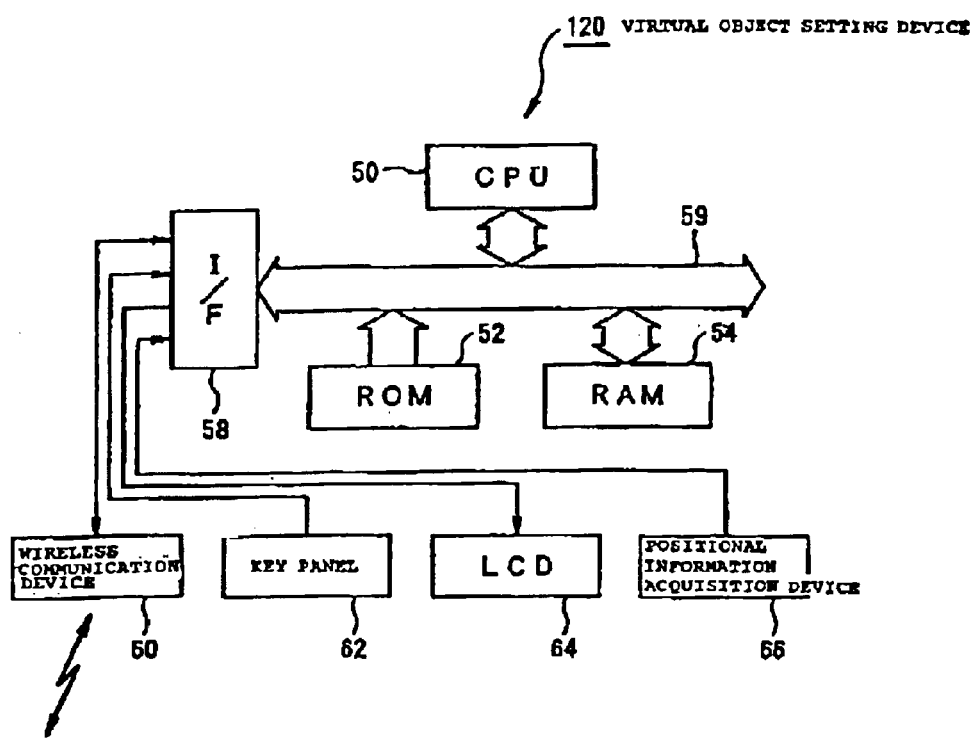

[FIG. 12]
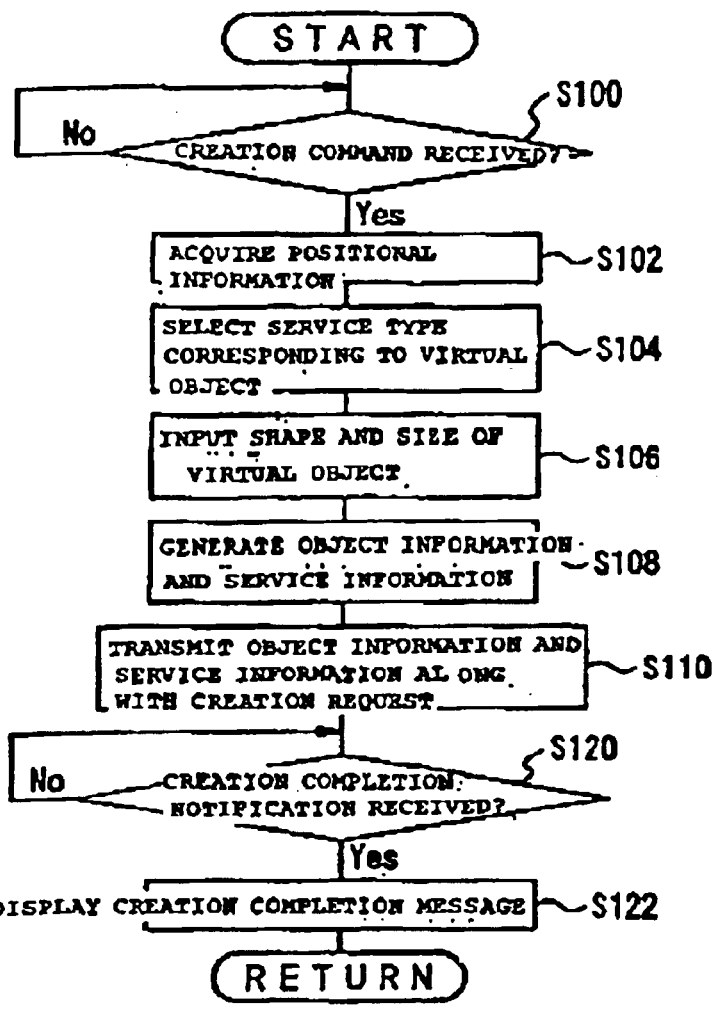

[FIG. 13]
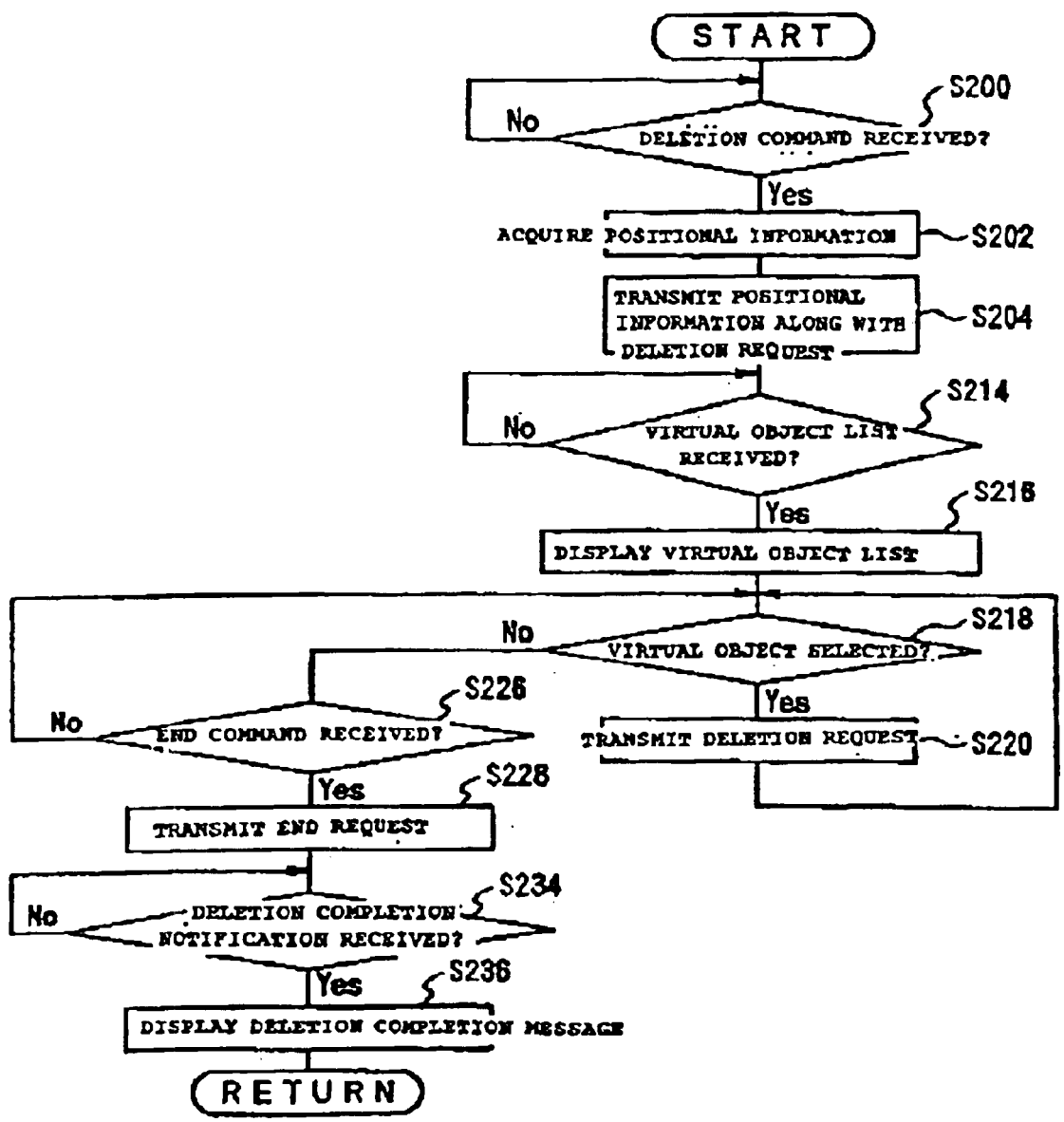

[FIG. 14]
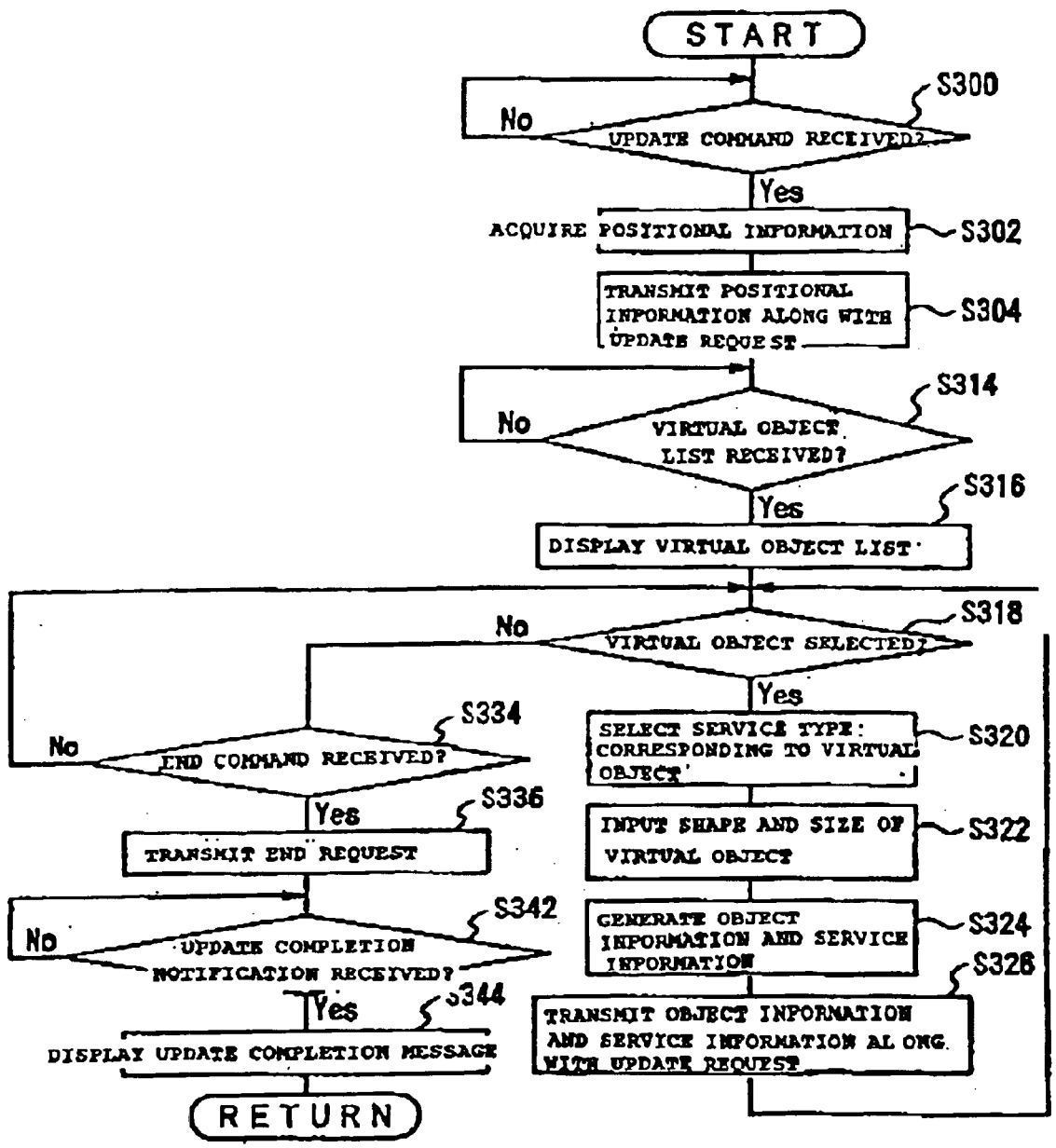

[FIG. 15]
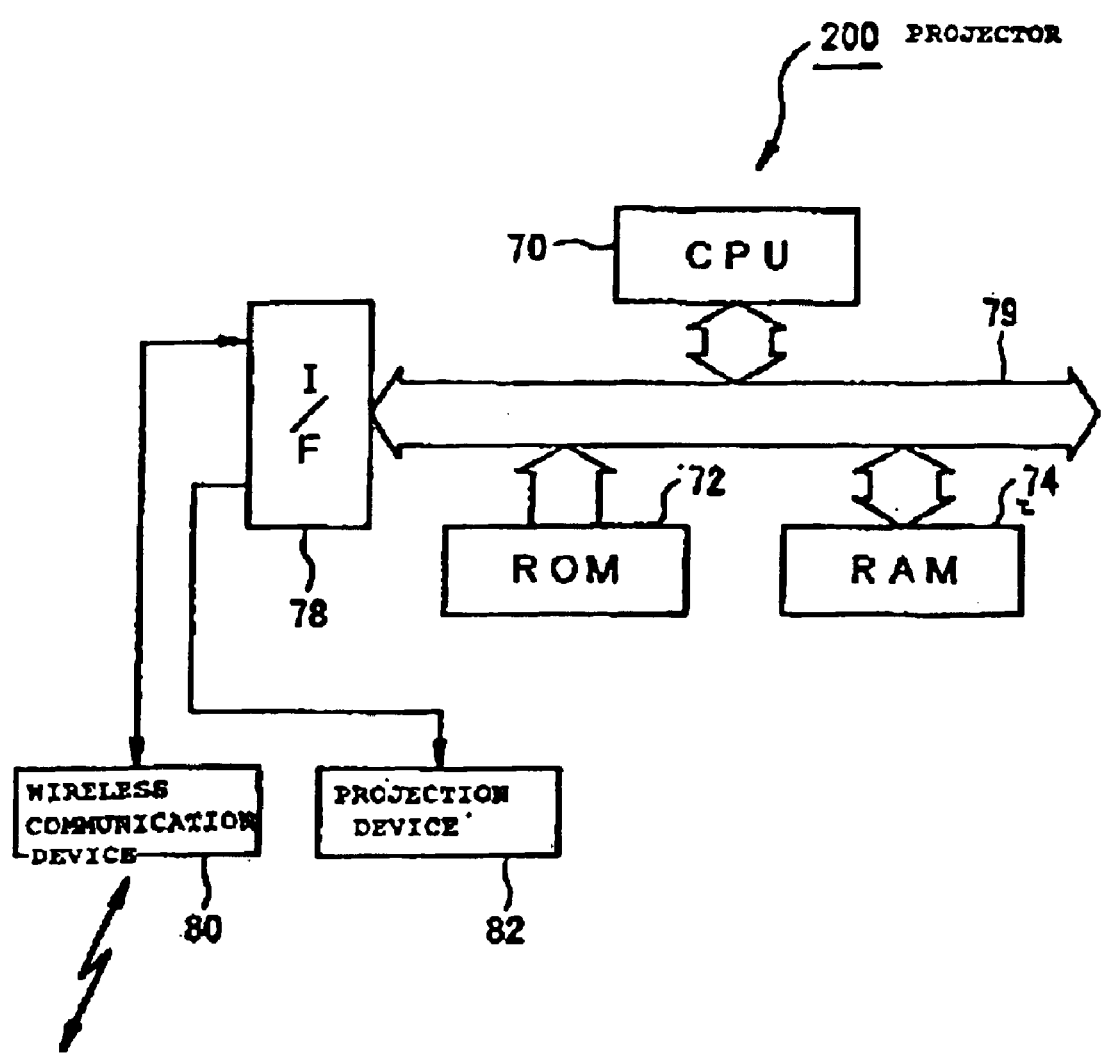

[FIG. 16]
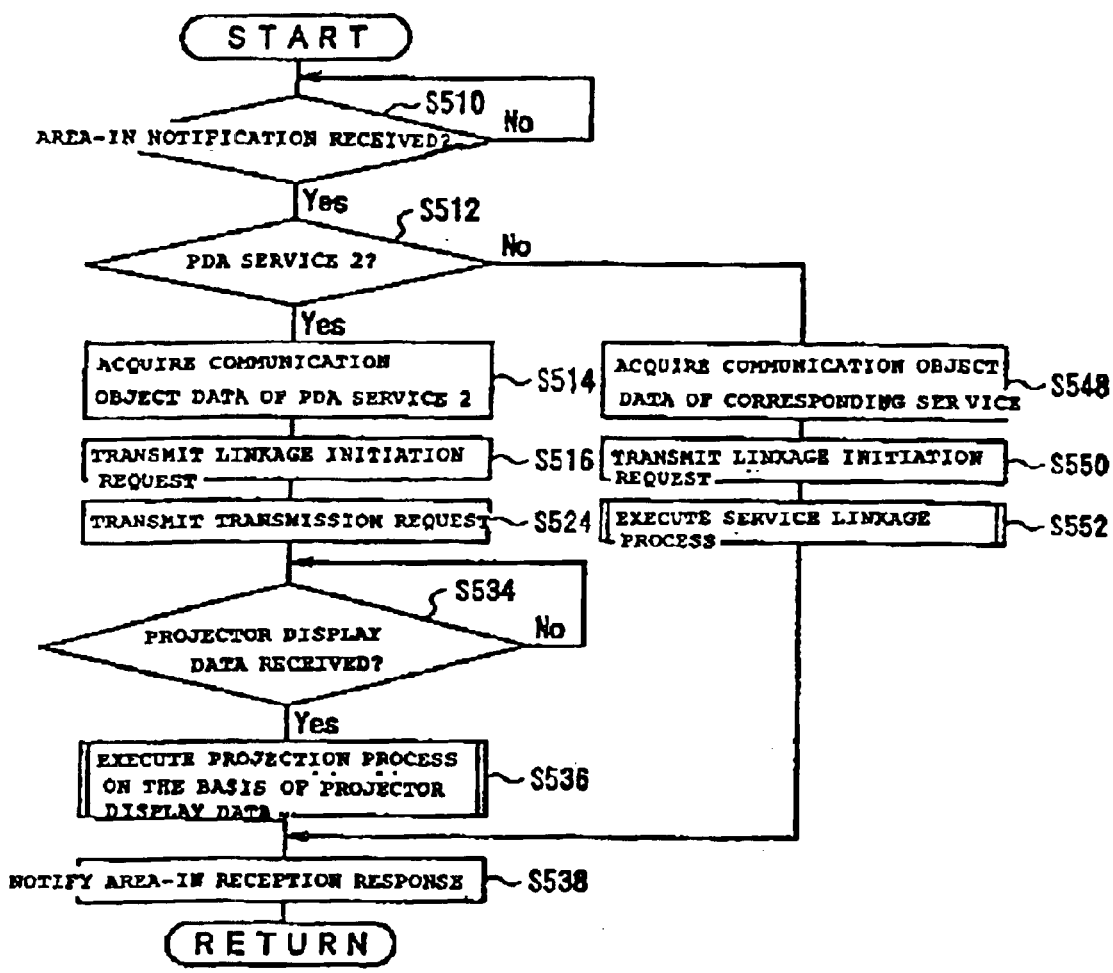

[FIG. 17]
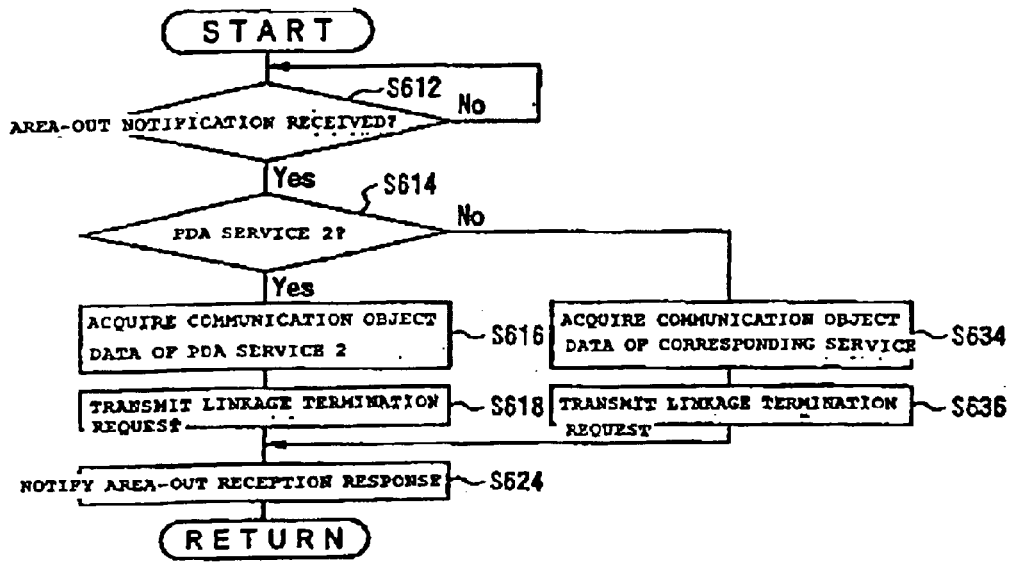
[FIG. 18]
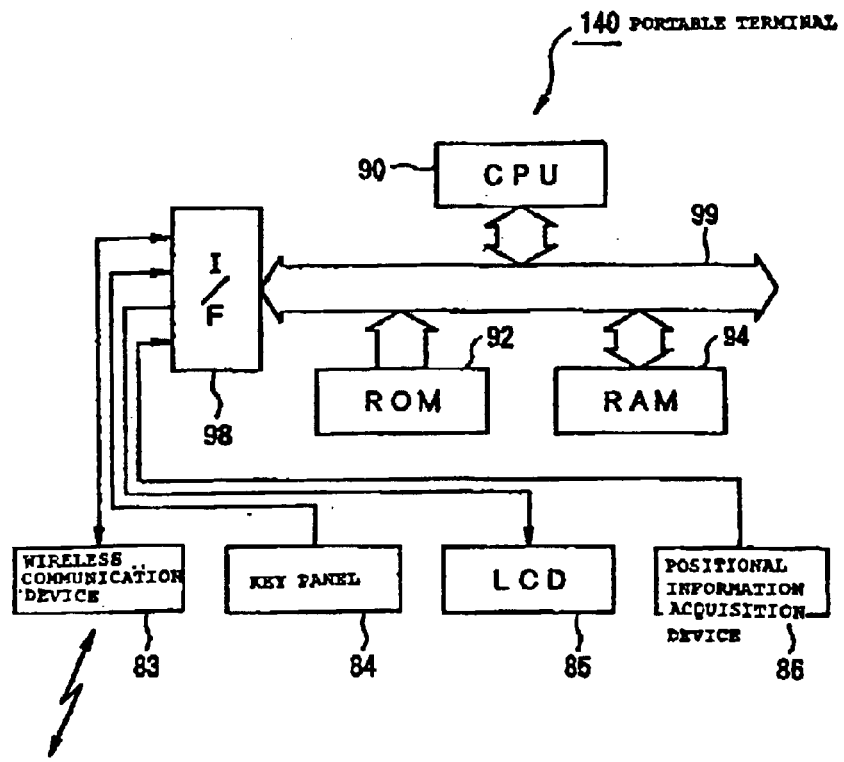

[FIG. 19]
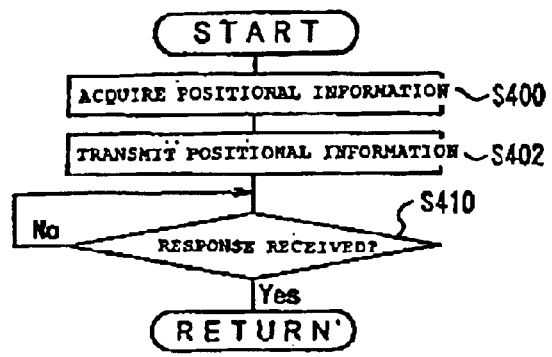
[FIG. 20]
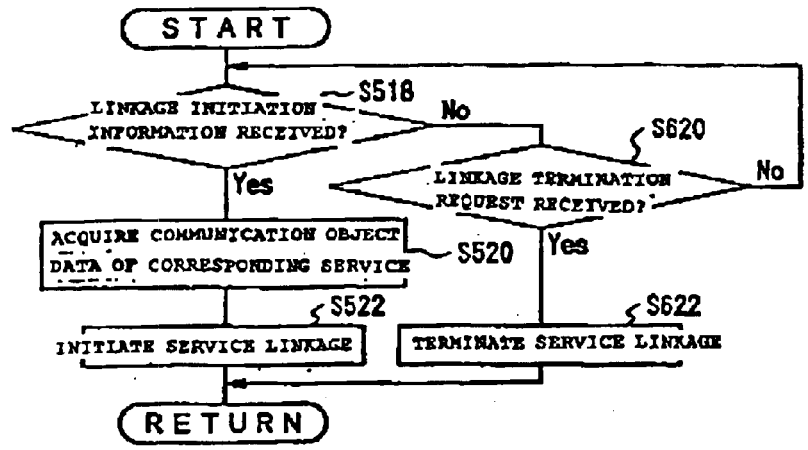

[FIG. 21]
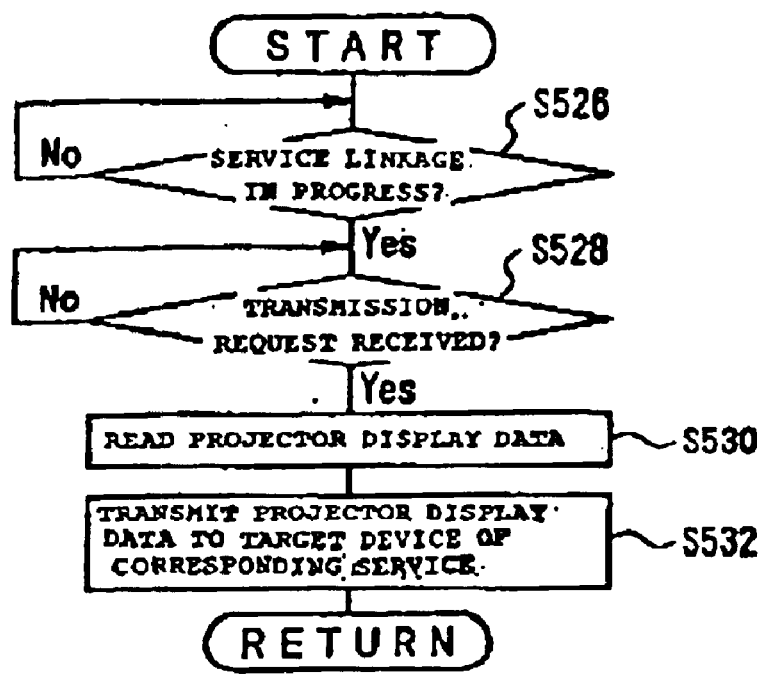

[FIG. 22]
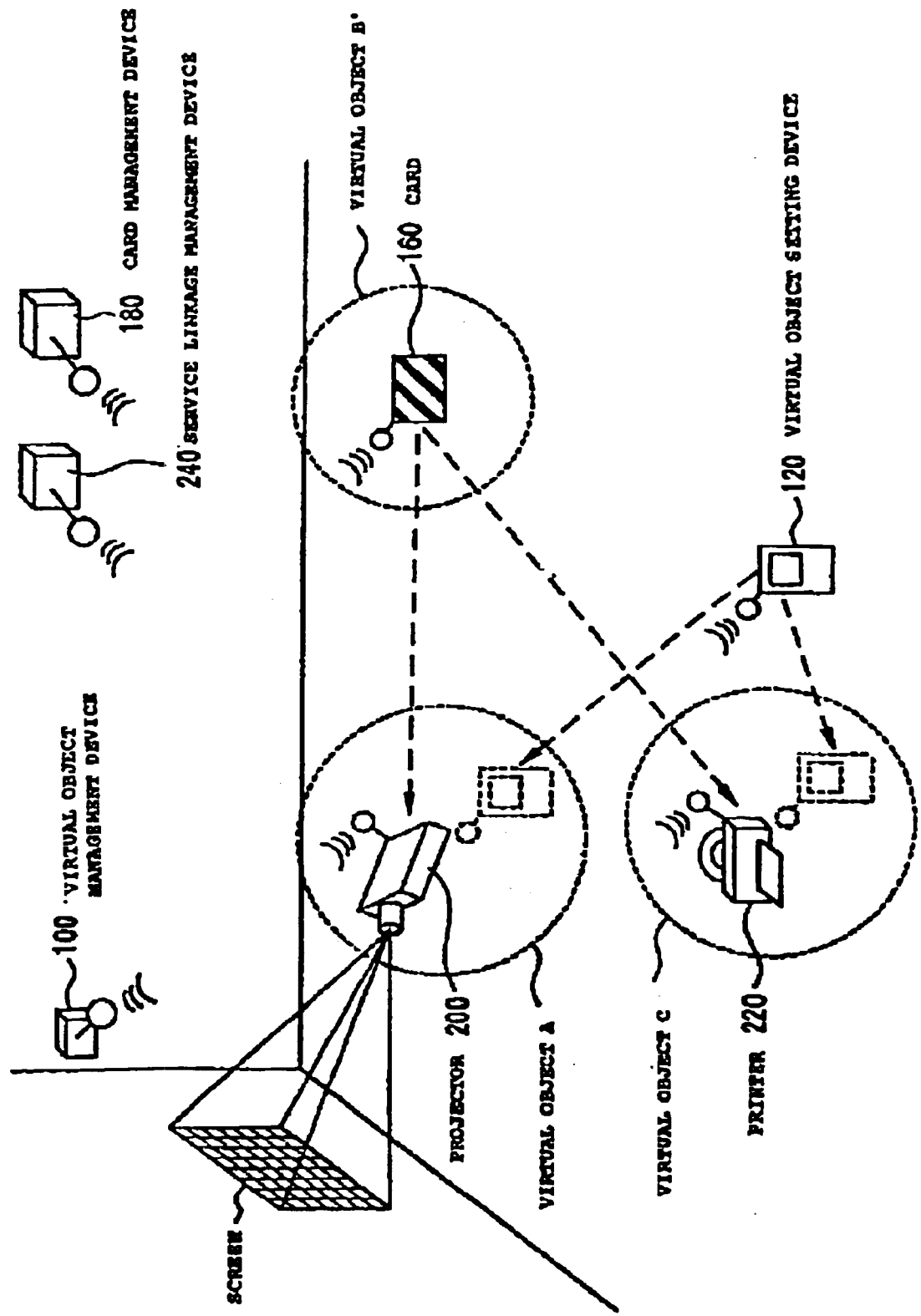

[FIG. 23]

400 VIRTUAL OBJECT MANAGEMENT TABLE

| SERIAL NUMBER | SERVICE TYPE | SERVICE ID | ORIGIN (x,y,z) | SHAPE | RANGE (m) | AREA-IN MANAGEMENT INFORMATION (Ex.0001,0002,...) |
|---|---|---|---|---|---|---|
| | 402 | 404 | 406 | 408 | 410 | 412 | 414 |
| 1 | PROJECTOR SERVICE | 0001 | 10,50,20 | SPHERE | 2 | |
| 2 | PDA SERVICE 1 | 0002 | 20,30,20 | SPHERE | 2 | |
| 3 | CARD SERVICE | 0005 | 30,40,20 | SPHERE | 1 | 0001 |
| 4 | PRINTER SERVICE | 0004 | 30,40,20 | SPHERE | 2 | |

SERVICE INFORMATION: columns 404, 406
OBJECT INFORMATION: columns 408, 410, 412

[FIG. 24]

500 COMMUNICATION INFORMATION REGISTRATION TABLE

| SERVICE ID | SERVICE TYPE | COMMUNICATION INFORMATION |
|---|---|---|
| 0001 | PROJECTOR SERVICE | COMMUNICATION OBJECT DATA A |
| 0002 | PDA SERVICE 1 | COMMUNICATION OBJECT DATA B |
| 0005 | CARD SERVICE | COMMUNICATION OBJECT DATA E |
| 0004 | PRINTER SERVICE | COMMUNICATION OBJECT DATA D |

502  504  506

OUTPUT SERVICE PROVIDING SYSTEM THAT UPDATES INFORMATION BASED ON POSITIONAL INFORMATION, TERMINAL, AND METHOD OF PROVIDING OUTPUT SERVICE

BACKGROUND OF THE INVENTION

1. Field of Invention

The present invention relates to a system, terminal, mobile object, program, and method for allowing virtual objects corresponding respectively to an output device, such as a projector or the like, and a mobile object, such as a portable terminal or the like, arranging the virtual objects respectively in a virtual space corresponding to a real space, and providing an output service by the output device on the basis of a positional relation between the virtual objects. More particularly, the present invention relates to an output service provision system, a virtual object management terminal, a mobile object, a virtual object management terminal program, a mobile object program, and an output service provision method which can allow a user to easily receive a provided output service, provide an output service responsive to the user, and flexibly cope with situational variations.

2. Description of Related Art

A conventional projector, which projects an image onto a screen, may include, for example, a connection terminal for connection with a computer or the like, and a projection device for projecting an image onto the screen on the basis of an image signal inputted through the connection terminal.

Each presenter does a presentation using such a conventional projector while projecting presentation data onto a screen by connecting a computer or the like, which stores projector display data to be projected by the projector as the presentation data, to the projector and operating the computer.

In the conventional projector, however, all of the presenters' presentation data must be stored in one computer, otherwise the presentation data will often be stored respectively in the numerous computers of the respective presenters. In such a case, for each presentation, the corresponding computer has to be connected to the projector, resulting in an inefficient use of effort and time for connection. Besides, the presenters must take their notetype computers to a presentation meeting place with efforts to carry them. In particular, in the case of doing presentations in a relatively large meeting place, it is very troublesome for the presenters to store the presentation data of all the presenters in one computer. Moreover, for a meeting promoter to do it places a heavy burden on the promoter.

SUMMARY OF THE INVENTION

Accordingly, there is a need to construct a system capable of presenting presentation data synthesized individually by each presenter in a simple manner, with no necessity for each presenter to take a computer to a presentation meeting place and no trouble of storing the presentation data in one computer. For example, one approach may be a system wherein a projector and a specific server are connected to communicate with each other; a presenter pre-stores presentation data in the specific server; the presentation data is automatically read and displayed from the specific server when the presenter does a presentation. The point of this system is that the presenter's presentation data, that is, presentation data responsive to the presenter can be read. In one structure employed to realize this point, the system may, for example, provide a projection service by the projector according to the movement of the presenter (or a relatively small thing carried by the presenter).

There have conventionally been proposed several examples of such a system. Conventional systems for provision of a service responsive to a user's movement may be, for example, an information presenting apparatus disclosed in Japanese laid-open Patent Application No. HEI 10-13720 (referred to hereinafter as a first conventional example) and a head mount display apparatus disclosed in Japanese laid-open Patent Application No. 2000-152125 (referred to hereinafter as a second conventional example).

In the first conventional example, detectors 103 and 104 detect the position and direction of a camera 101 through a global positioning system (GPS), respectively, and a user specifies an object in an image displayed on a display or finder 108. A controller 106 obtains positional information of the specified object by performing a computing operation on the basis of the position of the specified object and the detected position and direction. The controller 106 then produces the attribute data of the specified object corresponding to the obtained positional information from a map data storage unit 107 and displays the produced attribute data on the display or finder 108 or outputs it by speech synthesis manner.

As a result, the first conventional example can readily obtain the attribute data of an object in a displayed image and present it to the user.

In the second conventional example, an icon image is displayed on an image output unit 5 in response to an input from an operation input unit 6 such that it is positioned on a line of sight detected by a sight line detector 8. The overlap of the icon image with the actual field of view seen from a window is viewed by the eyes of an operator. The operator views along their line of sight to a desired portion in the view field and determines their focus at the desired portion by applying a command through the operation input unit 6. For example, if the operator views actual sentences before their eyes and specifies a specific area in the sentences, an image processor 7 reads sentences or words in the specified area from image information inputted from a CCD camera 3, translates the read sentences or words in a given language and displays the resulting data on the image output unit 5.

As a result, the second conventional example can select and specify an object in the actual field of view according to the movement of the operator's line of sight and process image information in the view field using the line of sight as input means.

However, because the first conventional example is configured to, when a user specifies an object in an image displayed on the display or finder 108, provide the attribute data of the specified object to the user, the user cannot obtain the attribute data useful thereto if they do not take an active action even though, for example, an object corresponding to the useful attribute data is in the vicinity of a place where the user is currently located.

Further, since the user is provided with only the attribute data, they can receive nothing but an information provision service. For example, the first conventional example has difficulty in satisfying, just as it is, the user's desire to display the contents of the attribute data corresponding to a certain object on the spot. As an alternative, the attribute data may be stored in a memory or the like, and then read and displayed under the condition that the memory is mounted to a different computer. However, this alternative is not efficient in use and does not satisfy the user's desire to display attribute data on the spot.

In addition, the first conventional example is not configured to enable the user or manager to create, delete, or update objects and the attribute data. For this reason, it is very hard for the first conventional example to be applied to a new object, such as a building, an object with a temporary location, such as an exhibit, or an inter-user information exchange. In case of the inter-user information exchange, in the first conventional example, for example, provided that a user views a picture in an art museum and expresses an appreciation of the picture, and a different user will be unable to read the attribute data of the appreciation when standing before the same picture in the future.

Meanwhile, like the first conventional example, because the second conventional example is configured to conduct a translation when a user views sentences before their eyes and specifies a specific area in the sentences, the user cannot receive a translation service if they do not take an active action. Moreover, since the user is provided with only a translation, they can receive nothing but an information provision service, similarly to the first conventional example.

Accordingly, in the case where the first and second conventional examples are applied to the above-mentioned projector example, a presenter cannot receive the projection service by the projector as long as they do not take an active action. In particular, it is difficult to realize the reading of presentation data responsive to the presenter. Furthermore, installation situations of meeting places or entries of presenters may be different with respect to respective presentation meetings, thereby making it difficult to create, delete, or update objects and the attribute data, as in the first conventional example. This leads to a considerable inconvenience for the meeting promoter.

The above problems will be widely treated at the present or in the future with respect to the provision of an output service by an output device, such as a display or printer, as well as the provision of the projection service by the projector.

Therefore, the present invention has been made in view of the above problems, and it is an object of the present invention to provide a system for providing a movement-based dynamic output service, particularly an output service provision system, a virtual object management terminal, a mobile object, a virtual object management terminal program, a mobile object program, and an output service provision method which can allow a user to easily receive a provided output service, provide an output service responsive to the user, and flexibly cope with situational variations.

In accordance with the present invention, the above and other objects can be accomplished by the provision of an output service provision system for allowing a first virtual object corresponding to an output device and allowing a second virtual object corresponding to a mobile object, respectively, arranging the first virtual object in a virtual space corresponding to a real space and arranging the second virtual object at a position of the mobile object in the virtual space or the vicinity thereof, respectively, and providing an output service associated with an output of the output device corresponding to the first virtual object on the basis of a positional relation between the first virtual object and the second virtual object. The output service provision system can include a first storage device for storing first object information regarding a shape and disposed position of the first virtual object in a manner corresponding to the output device, a second storage device for storing second object information regarding a shape and disposed position of the second virtual object in a manner corresponding to the mobile object, and a positional information acquisition device for acquiring positional information specifying the position of the mobile object. The second object information in the second storage device is updated on the basis of the positional information acquired by the positional information acquisition device, and providing the output service associated with the output of the output device corresponding to the first virtual object upon determining, on the basis of the first object information in the first storage device and the second object information in the second storage device, that an area specified by the shape and disposed position of the first virtual object is overlapped with an area specified by the shape and disposed position of the second virtual object.

With this structure, the positional information is acquired by the positional information acquisition device, and the second object information in the second storage device is updated on the basis of the acquired positional information. A determination is made, on the basis of the first object information in the first storage device and the second object information in the second storage device, as to whether the area specified by the shape and disposed position of the first virtual object is overlapped with the area specified by the shape and disposed position of the second virtual object. That is, if the mobile object is brought close to the area of the first virtual object or the vicinity thereof, the two areas are determined to have overlapped. If it is determined that the two areas have overlapped, the output service associated with the output of the output device corresponding to the first virtual object is provided.

Here, each virtual object has a logical shape and disposed position in the virtual space corresponding to the real space. For example, each virtual object may have a spherical shape with a radius of about 1[m] about its disposed position, a cubic shape with each side of about 1[m] about its disposed position, a shape modeled on a natural thing or living thing, or any other shape. Moreover, each virtual object is not limited to a stereoscopic shape, and may have a planar shape. Therefore, output service provision areas can be defined relatively clearly, thereby making it possible to provide different output services in respective small unit areas, such as several meters. Further, an output service provision area and an area corresponding to the mobile object are not limited to points, but have predetermined ranges, thereby enabling a user to easily receive an output service. This is similarly applied to an output service provision system a virtual object management terminal, a mobile object, a virtual object management terminal program, a mobile object program, and an output service provision method.

The mobile object may be a mobile object in the real space or a mobile object in the virtual space. In the former, the mobile object may be a portable terminal or vehicle. If the portable terminal or vehicle is applied as the mobile object, an output service responsive to the user's location can be provided. In the latter, the mobile object may be a mobile object on a computer simulation or a mobile object on a game. If the computer simulation is applied as the mobile object, an output service responsive to the position of the mobile object in the virtual space can be provided. This is similarly applied to an output service provision system, a virtual object management terminal, a mobile object, a mobile object program, and an output service provision method.

The output service is a service associated with an output of the output device. For example, the output service may be a print service if the output device is a printer, a display service if it is a display device, and a voice output service if it is a voice output device. This is similarly applied to an output service provision system, and an output service provision method.

The provision of the output service signifies a direct or indirect provision of the output service. For the indirect provision, for example, under the condition that the present system is communicatably connected with an external terminal capable of providing the output service, the present system may request the external terminal to provide the output service, and the external terminal may provide the output service in response to the provision request. That is, the present system may provide the output service in cooperation with one external terminal or a plurality of external terminals. This is similarly applied to an output service provision system, and an output service provision method.

The first storage device may store the first object information through any means and at any time, or pre-store it. Alternatively, the first storage device may store the first object information in response to an external input, etc. during the operation of the present system, without pre-storing the first object information. This is similarly applied to the storage of the second object information in the second storage device. Also, this is similarly applied to an output service provision system, and a virtual object management terminal.

The present system may be implemented as a single apparatus or a network system having a plurality of terminals interconnected in a communicatable manner. In the latter, each constituent element may belong to any of the plurality of terminals as long as it is communicatably connected. This is similarly applied to an output service provision system.

The positional information acquisition device may be provided in, for example, a communication terminal to which the mobile object is communicatably connected, to acquire the positional information by measuring the position of the mobile object. Alternatively, the mobile object may measure the position thereof using a GPS, etc., or the communication terminal may acquire the positional information by calculating it on the basis of measurement information from the mobile object. Or a base station to which the mobile object is connected may measure the position of the mobile object, or the communication terminal may acquire the positional information by calculating it on the basis of measurement information from the base station. This is similarly applied to an output service provision system, and a mobile object.

Further, in accordance with the present invention, there is provided an output service provision system, that is, the output service provision system, wherein a virtual object management terminal for managing said virtual object is connected with the mobile object in a communicatable manner. The mobile object can include the positional information acquisition device, and is adapted to transmit the positional information acquired from the positional information acquisition device to the virtual object management terminal. Further, the virtual object management terminal can include the first storage device and second storage device, and is adapted to, upon receiving the positional information, update the second object information in the second storage device on the basis of the received positional information, and to determine, on the basis of the first object information in the first storage device and the second object information in the second storage device, whether the area specified by the shape and disposed position of the first virtual object is overlapped with the area specified by the shape and disposed position of the second virtual object.

With this structure, the mobile object acquires the positional information by the positional information acquisition device and transmits the acquired positional information to the virtual object management terminal.

The virtual object management terminal, upon receiving the positional information, updates the second object information in the second storage device on the basis of the received positional information. The virtual object management terminal also determines, on the basis of the first object information in the first storage device and the second object information in the second storage device, whether the area specified by the shape and disposed position of the first virtual object is overlapped with the area specified by the shape and disposed position of the second virtual object.

Here, the provision of the output service may be made at any place and by the mobile object or any other device, not limited to the virtual object management terminal. For the output service provision by the virtual object management terminal, for example, the virtual object management terminal may provide the output service associated with the output of the output device corresponding to the first virtual object upon determining that the area of the first virtual object is overlapped with the area of the second virtual object. For the output service provision by the mobile object, for example, the virtual object management terminal may transmit the determination result to the mobile object, and the mobile object may receive the determination result and provide the output service associated with the output of the output device corresponding to the first virtual object if the received determination result indicates that the area of the first virtual object is overlapped with the area of the second virtual object.

The virtual object management terminal may be communication equipment which is connected to one end of a communication path with the mobile object and basically has a server function. Alternatively, the virtual object management terminal may be configured to have both a client function and server function. This is similarly applied to an output service provision system, a virtual object management terminal, a mobile object, and a virtual object management terminal program.

The transmission of the positional information signifies that the mobile object transmits the positional information directly or indirectly to the virtual object management terminal. For the indirect transmission, for example, under the condition that the mobile object is communicatably connected with an external terminal, the mobile object may transmit the positional information to the virtual object management terminal via the external terminal. That is, the mobile object may transmit the positional information in cooperation with one external terminal or a plurality of external terminals.

Further, in accordance with the present invention, there is provided an output service provision system, that is, the output service provision system described above, wherein a virtual object management terminal for managing the virtual object is connected with the mobile object in a communicatable manner. The virtual object management terminal can include the first storage device, and is adapted to transmit the first object information in the first storage device to the mobile object. Further, the mobile object can include the second storage device and positional information acquisition device, and is adapted to update the second object information in the second storage device on the basis of the positional information acquired from the positional information acquisition device, and to, upon receiving the first object information, determine, on the basis of the received first object information and the second object information in the second storage device, whether the area specified by the shape and disposed position of the first virtual object is overlapped with the area specified by the shape and disposed position of the second virtual object.

With this structure, the virtual object management terminal transmits the first object information in the first storage device to the mobile object. The mobile object acquires the positional information by the positional information acquisition device and updates the second object information in the second storage device on the basis of the acquired positional information. The mobile object, upon receiving the first object information, determines, on the basis of the received first object information and the second object information in the second storage device, whether the area specified by the shape and disposed position of the first virtual object is overlapped with the area specified by the shape and disposed position of the second virtual object.

Here, the provision of the output service may be made at any place and by the virtual object management terminal or any other device, not limited to the mobile object. For the output service provision by the mobile object, for example, the virtual object management terminal may transmit the first object information in the first storage device to the mobile object, and the mobile object may receive the first object information and provide the output service associated with the output of the output device corresponding to the first virtual object upon determining, on the basis of the received first object information and the second object information in the second storage device, that the area of the first virtual object is overlapped with the area of the second virtual object. For the output service provision by the virtual object management terminal, for example, the mobile object may transmit the determination result to the virtual object management terminal, and the virtual object management terminal may receive the determination result and provide the output service associated with the output of the output device corresponding to the first virtual object if the received determination result indicates that the area of the first virtual object is overlapped with the area of the second virtual object.

The transmission of the first object information signifies that the virtual object management terminal transmits the first object information directly or indirectly to the mobile object. For the indirect transmission, for example, under the condition that the virtual object management terminal is communicatably connected with an external terminal, the virtual object management terminal may transmit the first object information to the mobile object via the external terminal. That is, the virtual object management terminal may transmit the first object information in cooperation with one external terminal or a plurality of external terminals.

Further, in accordance with the present invention, there is provided an output service provision system, that is, the output service provision system described above, further including an output data storage device for storing output data, which is transmitted to the output device, in a manner corresponding to the mobile object;. The virtual object management terminal can be adapted to transmit output data corresponding to the mobile object as the second virtual object, among the output data in the output data storage means, to the output device as the first virtual object if it is determined that the area specified by the shape and disposed position of the first virtual object is overlapped with the area specified by the shape and disposed position of the second virtual object.

With this structure, the virtual object management terminal can transmit the output data corresponding to the mobile object as the second virtual object, among the output data in the output data storage device, to the output device as the first virtual object if it is determined that the area of the first virtual object is overlapped with the area of the second virtual object.

The transmission of the output data signifies that the virtual object management terminal transmits the output data directly or indirectly. For the indirect transmission, for example, under the condition that the virtual object management terminal is communicatably connected with an external terminal storing the output data, the virtual object management terminal may request the external terminal to transmit the output data, and the external terminal may transmit the output data in response to the transmission request. That is, the virtual object management terminal may transmit the output data in cooperation with one external terminal or a plurality of external terminals.

The output data storage device may store the output data through any technique and at any time, or pre-store it. Alternatively, the output data storage device may store the output data in response to an external input, etc. during the operation of the present system, without pre-storing the output data. This is similarly applied to an output service provision system.

Further, in accordance with the present invention, there is provided an output service provision system, that is, the output service provision system as described above, further including an output data storage device for storing output data, which is transmitted to the output device, in a manner corresponding to the mobile object. The mobile object is adapted to transmit output data corresponding to the mobile object as the second virtual object, among the output data in the output data storage means, to the output device as the first virtual object if it is determined that the area specified by the shape and disposed position of the first virtual object is overlapped with the area specified by the shape and disposed position of the second virtual object.

With this structure, the mobile object transmits the output data corresponding to the mobile object as the second virtual object, among the output data in the output data storage device, to the output device as the first virtual object if it is determined that the area of the first virtual object is overlapped with the area of the second virtual object.

The transmission of the output data signifies that the mobile object transmits the output data directly or indirectly. For the indirect transmission, for example, under the condition that the mobile object is communicatably connected with an external terminal storing the output data, the virtual object management terminal may request the external terminal to transmit the output data, and the external terminal may transmit the output data in response to the transmission request. That is, the mobile object may transmit the output data in cooperation with one external terminal or a plurality of external terminals.

Further, in accordance with the present invention, there is provided an output service provision system for interconnecting a virtual object management terminal managing virtual objects, an output device, and a portable terminal in a communicatable manner, allowing a first virtual object corresponding to the output device and allowing a second virtual object corresponding to the portable terminal, respectively, arranging the first virtual object in a virtual space corresponding to a real space and arranging the second virtual object at a position of the portable terminal in the virtual space or the vicinity thereof, respectively, and providing an output service associated with an output of the output device corresponding to the first virtual object on the basis of a positional relation between the first virtual object and the second virtual object. The output service provision system including a positional information acquisition device for acquiring positional information specifying the position of the portable terminal. The virtual object management terminal can include a first storage device for storing first object information regarding a shape and disposed position of the first virtual object in a manner corresponding to the output device, and a second storage device for storing second object information regarding a shape and disposed position of the second virtual object in a manner corresponding to the portable terminal, and is adapted to update the second object information in the second storage device on the basis of the positional information acquired by the positional information acquisition device, and transmit a provision request to provide the output service associated with the output of the output device corresponding to the first virtual object, upon determining, on the basis of the first object information in the first storage device and the second object information in the second storage device, that an area specified by the shape and disposed position of the first virtual object is overlapped with an area specified by the shape and disposed position of the second virtual object. The portable terminal can include output data storage device for storing output data, which is transmitted to the output device, and is adapted to, upon receiving the provision request, transmit the output data in the output data storage device to the output device associated with the received provision request. Further, the output device is adapted to, upon receiving the output data, provide its output on the basis of the received output data.

With this structure, the positional information is acquired by the positional information acquisition device, and the virtual object management terminal updates the second object information in the second storage device on the basis of the acquired positional information. A determination is made, on the basis of the first object information in the first storage device and the second object information in the second storage device, as to whether the area specified by the shape and disposed position of the first virtual object is overlapped with the area specified by the shape and disposed position of the second virtual object. That is, if the portable terminal is brought close to the area of the first virtual object or the vicinity thereof, the two areas are determined to have overlapped. If it is determined that the two areas have overlapped, the virtual object management terminal transmits the provision request to provide the output service associated with the output of the output device corresponding to the first virtual object.

The portable terminal, upon receiving the provision request, transmits the output data in the output data storage to the output device associated with the received provision request.

The output device, upon receiving the output data, provides its output on the basis of the received output data.

The transmission of the provision request signifies that the virtual object management terminal transmits the provision request directly or indirectly to the portable terminal. For the indirect transmission, for example, under the condition that the virtual object management terminal is communicatably connected with an external terminal, the virtual object management terminal may transmit the provision request to the portable terminal via the external terminal. That is, the virtual object management terminal may transmit the provision request in cooperation with one external terminal or a plurality of external terminals. This is similarly applied to an output service provision system.

The positional information acquisition device may be provided in, for example, a communication terminal to which the portable terminal is communicatably connected, to acquire the positional information by measuring the position of the portable terminal. Alternatively, the portable terminal may measure the position thereof using a GPS, etc., or the communication terminal may acquire the positional information by calculating it on the basis of measurement information from the portable terminal. Or, a base station to which the portable terminal is connected may measure the position of the portable terminal, or the communication terminal may acquire the positional information by calculating it on the basis of measurement information from the base station. Alternatively, the positional information acquisition device may be installed in any of the virtual object management terminal, the output device, the portable terminal, and other external terminals communicatably connected to the virtual object management terminal. This is similarly applied to an output service provision system.

Further, in accordance with the present invention, there is provided an output service provision system, that is, the output service provision system as described above, wherein the portable terminal is connected with a communication service provision terminal in a communicatable manner, the communication service provision terminal providing a communication service with the portable terminal. The communication service provision terminal can include a constituent information storage device for storing communication establishment constituent information, the constituent information having a communication establishment device for establishing communication with the portable terminal. The virtual object management terminal is adapted to transmit the provision request to the output device corresponding to the first virtual object upon determining that the area specified by the shape and disposed position of the first virtual object is overlapped with the area specified by the shape and disposed position of the second virtual object. The output device is adapted to, upon receiving the provision request, acquire the communication establishment device constituent information from the communication service provision terminal, constitute the communication establishment device on the basis of the acquired communication establishment device constituent information, and transmit the provision request to the portable terminal associated with the received provision request on the basis of the constituted communication establishment device. Further, the portable terminal is adapted to, upon receiving the provision request, transmit the output data in the output data storage device to the output device associated with the received provision request.

With this structure, the virtual object management terminal transmits the provision request to the output device corresponding to the first virtual object upon determining that the area of the first virtual object is overlapped with the area of the second virtual object.

The output device, upon receiving the provision request, acquires the communication establishment device constituent information from the communication service provision terminal and constitutes the communication establishment device on the basis of the acquired communication establishment device constituent information. The output device then transmits the provision request to the portable terminal associated with the received provision request on the basis of the constituted communication establishment device.

The portable terminal, upon receiving the provision request, transmits the output data in the output data storage device to the output device associated with the received provision request.

The constituent information storage device may store the communication establishment device constituent information through any device and at any time, or prestore it. Alternatively, the constituent information storage device may store the communication establishment device constituent information in response to an external input, etc. during the operation of the present system, without pre-storing the communication establishment device constituent information. This is similarly applied to an output service provision system.

The communication service provision terminal may be communication equipment which is connected to one end of a communication path with the output device and basically can have a server function. Alternatively, the communication service provision terminal may be configured to have both a client function and server function. This is similarly applied to an output service provision system described above.

Further, in accordance with the present invention, there can be provided an output service provision system, for interconnecting a virtual object management terminal managing virtual objects, an output device, and a portable object management terminal managing a portable object in a communicatable manner, allowing a first virtual object corresponding to the output device and allowing a second virtual object corresponding to the portable object, respectively, arranging the first virtual object in a virtual space corresponding to a real space and arranging the second virtual object at a position of the portable object in the virtual space or the vicinity thereof, respectively, and providing an output service associated with an output of the output device corresponding to the first virtual object on the basis of a positional relation between the first virtual object and the second virtual object. The output service provision system can include a positional information acquisition device for acquiring positional information specifying the position of the portable object. The virtual object management terminal can include a first storage device for storing first object information regarding a shape and disposed position of the first virtual object in a manner corresponding to the output device, and a second storage device for storing second object information regarding a shape and disposed position of the second virtual object in a manner corresponding to the portable object, and is adapted to update the second object information in the second storage device on the basis of the positional information acquired by the positional information acquisition device, and transmit a provision request to provide the output service associated with the output of the output device corresponding to the first virtual object, upon determining, on the basis of the first object information in the first storage device and the second object information in the second storage device, that an area specified by the shape and disposed position of the first virtual object is overlapped with an area specified by the shape and disposed position of the second virtual object. The portable object management terminal can include output data storage device for storing output data, which is transmitted to the output device, in a manner corresponding to the portable object, and is adapted to, upon receiving the provision request, transmit output data corresponding to the portable object associated with the received provision request, among the output data in the output data storage device, to the output device associated with the received provision request. Further, the output device can be adapted to, upon receiving the output data, provide its output on the basis of the received output data.

With this structure, the positional information is acquired by the positional information acquisition device, and the virtual object management terminal updates the second object information in the second storage device on the basis of the acquired positional information. A determination is made, on the basis of the first object information in the first storage device and the second object information in the second storage device, as to whether the area specified by the shape and disposed position of the first virtual object is overlapped with the area specified by the shape and disposed position of the second virtual object. That is, if the portable object is brought close to the area of the first virtual object or the vicinity thereof, the two areas are determined to have overlapped. If it is determined that the two areas have overlapped, the virtual object management terminal transmits the request to provide the output service associated with the output of the output device corresponding to the first virtual object.

The portable object management terminal, upon receiving the provision request, transmits the output data corresponding to the portable object associated with the received provision request, among the output data in the output data storage means, to the output device associated with the received provision request.

The output device, upon receiving the output data, provides its output on the basis of the received output data.

The transmission of the provision request signifies that the virtual object management terminal transmits the provision request directly or indirectly to the portable object management terminal. For the indirect transmission, for example, under the condition that the virtual object management terminal is communicatably connected with an external terminal, the virtual object management terminal may transmit the provision request to the portable object management terminal via the external terminal. That is, the virtual object management terminal may transmit the provision request in cooperation with one external terminal or a plurality of external terminals. This is similarly applied to an output service provision system described above.

The positional information acquisition device may be provided in, for example, a communication terminal to which the portable object is communicatably connected, to acquire the positional information by measuring the position of the portable object. Alternatively, the portable object may measure the position thereof using a GPS, etc., or the communication terminal may acquire the positional information by calculating it on the basis of measurement information from the portable object. Or, a base station to which the portable object is connected may measure the position of the portable object, or the communication terminal may acquire the positional information by calculating it on the basis of measurement information from the base station. Alternatively, the positional information acquisition device may be installed in any of the virtual object management terminal, the output device, the portable object, the portable object management terminal, and other external terminals communicatably connected to the virtual object management terminal. This is similarly applied to an output service provision system described above.

The portable object management terminal may be communication equipment which is connected to one-side ends of communication paths with the virtual object management terminal and output device, and basically can have a server function. Alternatively, the portable object management terminal may be configured to have both a client function and server function. This is similarly applied to an output service provision system described above.

Further, in accordance with the present invention, there is provided an output service provision system, that is, the output service provision system as described above, wherein the portable object management terminal is connected with a communication service provision terminal in a communicatable manner, the communication service provision terminal providing a communication service with the portable object management terminal. The communication service provision terminal includes a constituent information storage device for storing communication establishment device constituent information, the constituent information constituting communication establishment device for establishing communication with the portable object management terminal. The virtual object management terminal is adapted to transmit the provision request to the output device corresponding to the first virtual object upon determining that the area specified by the shape and disposed position of the first virtual object is overlapped with the area specified by the shape and disposed position of the second virtual object. The output device is adapted to, upon receiving the provision request, acquire the communication establishment device constituent information from the communication service provision terminal, constitute the communication establishment device on the basis of the acquired communication establishment device constituent information, and transmit the provision request to the portable object management terminal associated with the received provision request on the basis of the constituted communication establishment device. Further, the portable object management terminal is adapted to, upon receiving the provision request, transmit the output data corresponding to the portable object associated with the received provision request, among the output data in the output data storage device, to the output device associated with the received provision request.

With this structure, the virtual object management terminal transmits the provision request to the output device corresponding to the first virtual object upon determining that the area of the first virtual object is overlapped with the area of the second virtual object.

The output device, upon receiving the provision request, acquires the communication establishment device constituent information from the communication service provision terminal and constitutes the communication establishment device on the basis of the acquired communication establishment device constituent information. The output device then transmits the provision request to the portable object management terminal associated with the received provision request on the basis of the constituted communication establishment device.

The portable object management terminal, upon receiving the provision request, transmits the output data corresponding to the portable object associated with the received provision request, among the output data in the output data storage device, to the output device associated with the received provision request.

Further, in accordance with the present invention, there is provided an output service provision system, that is, the output service provision system as set forth above, wherein the virtual object management terminal further includes an input device for receiving input contents regarding creation, deletion, or update of the first object information and an object information processing device for creating, deleting, or updating the first object information on the basis of the input contents received by the input device.

With this structure, the virtual object management terminal receives input contents regarding creation, deletion, or update of the first object information through the input means, and creates, deletes, or updates the first object information on the basis of the received input contents through the object information processing means.

Here, the input device may be a device for enabling a direct input by the virtual object management terminal or an input by communication with the mobile object or any other device.

Further, in accordance with the present invention, there is provided an output service provision system, that is, the output service provision system as set forth above, wherein the output device is a projection-type display device.

With this structure, the positional information is acquired by the positional information acquisition device, and the second object information in the second storage device is updated on the basis of the acquired positional information. A determination is made, on the basis of the first object information in the first storage device and the second object information in the second storage device, as to whether the area specified by the shape and disposed position of the first virtual object is overlapped with the area specified by the shape and disposed position of the second virtual object. If it is determined that the two areas have overlapped, a display service by the projection-type display device corresponding to the first virtual object can be provided.

Further, in accordance with the present invention, there is provided an output service provision system for allowing a first virtual object corresponding to an output device and allowing a second virtual object corresponding to a mobile object, respectively, arranging the first virtual object in a virtual space corresponding to a real space and arranging the second virtual object at a position of the mobile object in the virtual space or the vicinity thereof, respectively, and providing an output service associated with an output of the output device corresponding to the first virtual object on the basis of a positional relation between the first virtual object and the second virtual object. The output service provision system can include a first storage device for storing first object information regarding the first virtual object in a manner corresponding to the output device, a second storage device for storing second object information regarding the second virtual object in a manner corresponding to the mobile object. The output service associated with the output of the output device corresponding to the first virtual object is provided, upon determining on the basis of the first object information in the first storage device and the second object information in the second storage device, that the positional relation between the first virtual object and the second virtual object satisfies a predetermined condition, an input device for receiving input contents regarding creation, deletion, or update of the first object information, and object information processing device for creating, deleting, or updating the first object information on the basis of the input contents received by the input device.

With this structure, a determination is made, on the basis of the first object information in the first storage device and the second object information in the second storage device, as to whether the positional relation between the first virtual object and the second virtual object satisfies the predetermined condition. If it is determined that the positional relation satisfies the predetermined condition, the output service associated with the output of the output device corresponding to the first virtual object is provided. Moreover, if a user, a system manager or other person inputs the contents regarding creation, deletion, or update of the first object information through the input device, the object information processing device creates, deletes, or updates the first object information on the basis of the input contents.

Further, in accordance with the present invention, there is provided an output service provision system for interconnecting a virtual object management terminal managing a virtual object, an output device, and a portable terminal in a communicatable manner, allowing the virtual object in a manner corresponding to the output device, arranging the virtual object in a virtual space corresponding to a real space, and providing an output service associated with an output of the output device corresponding to the virtual object on the basis of a positional relation between the portable terminal and the virtual object. The output service provision system can include a positional information acquisition device for acquiring positional information specifying the position of the portable terminal. The virtual object management terminal includes object information storage device for storing object information regarding a shape and disposed position of the virtual object in a manner corresponding to the output device, and is adapted to transmit a provision request to provide the output service associated with the output of the output device corresponding to the virtual object, upon determining, on the basis of the positional information acquired by the positional information acquisition device and the object information in the object information storage means, that the portable terminal exists in an internal area of the virtual object specified by the shape and disposed position of the virtual object. The portable terminal includes output data storage device for storing output data, which is transmitted to the output device, and is adapted to, upon receiving the provision request, transmit the output data in the output data storage device to the output device associated with the received provision request. The output device is adapted to, upon receiving the output data, provide its output on the basis of the received output data.

With this structure, the positional information is acquired by the positional information acquisition device, and the virtual object management terminal determines, on the basis of the acquired positional information and the object information in the object information storage device, whether the portable terminal exists in the internal area of the virtual object specified by the shape and disposed position of the virtual object. Upon determining that the portable terminal exists in the internal area of the virtual object, the virtual object management terminal transmits the provision request to provide the output service associated with the output of the output device corresponding to the virtual object.

The portable terminal, upon receiving the provision request, transmits the output data in the output data storage device to the output device associated with the received provision request. The output device, upon receiving the output data, provides its output on the basis of the received output data.

The object information storage device may store the object information through any device and at any time, or pre-store it. Alternatively, the object information storage device may store the object information in response to an external input, etc. during the operation of the present system, without pre-storing the object information. This is similarly applied to an output service provision system described above.

Further, in accordance with the present invention, there can be provided an output service provision system, for interconnecting a virtual object management terminal managing a virtual object, an output device, and a portable object management terminal managing a portable object in a communicatable manner, allowing the virtual object in a manner corresponding to the output device, arranging the virtual object in a virtual space corresponding to a real space, and providing an output service associated with an output of the output device corresponding to the virtual object on the basis of a positional relation between the portable object and the virtual object. The output service provision system can include a positional information acquisition device for acquiring positional information specifying the position of the portable object. The virtual object management terminal can include an object information storage device for storing object information regarding a shape and disposed position of the virtual object in a manner corresponding to the output device, and can be adapted to transmit a provision request to provide the output service associated with the output of the output device corresponding to the virtual object, upon determining, on the basis of the positional information acquired by the positional information acquisition device and the object information in the object information storage device, that the portable object exists in an internal area of the virtual object specified by the shape and disposed position of the virtual object. Further, the portable object management terminal can include an output data storage device for storing output data to the output device in a manner corresponding to the portable object, and is adapted to, upon receiving the provision request, transmit output data corresponding to the portable object associated with the received provision request, among the output data in the output data storage device, to the output device associated with the received provision request.

With this structure, the positional information is acquired by the positional information acquisition device, and the virtual object management terminal determines, on the basis of the acquired positional information and the object information in the object information storage device, whether the portable object exists in the internal area of the virtual object specified by the shape and disposed position of the virtual object. Upon determining that the portable object exists in the internal area of the virtual object, the virtual object management terminal transmits the provision request to provide the output service associated with the output of the output device corresponding to the virtual object.

The portable object management terminal, upon receiving the provision request, transmits the output data corresponding to the portable object associated with the received provision request, among the output data in the output data storage means, to the output device associated with the received provision request. The output device, upon receiving the output data, provides its output on the basis of the received output data.

Further, in accordance with the present invention, there is provided a virtual object management terminal communicatably connected with the mobile object in the output service provision system as above, including a first storage device for storing the first object information in a manner corresponding to the output device, a and second storage device for storing the second object information in a manner corresponding to the mobile object. The second object information in the second storage device is updated on the basis of the positional information upon receiving the positional information, and providing the determination, on the basis of the first object information in the first storage device and the second object information in the second storage device, whether the area specified by the shape and disposed position of the first virtual object is overlapped with the area specified by the shape and disposed position of the second virtual object.

With this structure, the same effect as that of the virtual object management terminal in the output service provision system described above can be obtained.

Further, in accordance with the present invention, there is provided a mobile object communicatably connected with the virtual object management terminal in the output service provision system as set forth above, including a second storage device for storing the second object information in a manner corresponding to the mobile object, and a positional information acquisition device for acquiring positional information specifying the position of the mobile object. The second object information in the second storage device is updated on the basis of the positional information acquired from the positional information acquisition device and, upon receiving the first object information, and providing the determination, on the basis of the received first object information and the second object information in the second storage device, whether the area specified by the shape and disposed position of the first virtual object is overlapped with the area specified by the shape and disposed position of the second virtual object.

With this structure, the same effect as that of the mobile object in the output service provision system described above can be obtained.

Further, in accordance with the present invention, there is provided a virtual object management terminal program run in the virtual object management terminal, as a computer, as set forth above. The virtual object management terminal program can include a process of updating the second object information in the second storage device on the basis of the positional information upon receiving the positional information, and a process of determining, on the basis of the first object information in the first storage device and the second object information in the second storage device, whether the area specified by the shape and disposed position of the first virtual object is overlapped with the area specified by the shape and disposed position of the second virtual object.

With this structure, the virtual object management terminal reads the program and executes the process according to the read program. Therefore, the same effect as that of the virtual object management terminal described above can be obtained.

Further, in accordance with the present invention, there is provided a mobile object program that can run in the mobile object, as a computer. The mobile object program can include a process of updating the second object information in the second storage device on the basis of the positional information acquired from the positional information acquisition device; and a process of determining, upon receiving the first object information, on the basis of the received first object information and the second object information in the second storage device, whether the area specified by the shape and disposed position of the first virtual object is overlapped with the area specified by the shape and disposed position of the second virtual object.

With this structure, the mobile object reads the program and executes the process according to the read program. Therefore, the same effect as that of the mobile object described above can be obtained.

Further, in accordance with the present invention, there is provided an output service provision method for allowing a first virtual object corresponding to an output device and allowing a second virtual object corresponding to a mobile object, respectively, arranging the first virtual object in a virtual space corresponding to a real space and arranging the second virtual object at a position of the mobile object in the virtual space or the vicinity thereof, respectively, and providing an output service associated with an output of the output device corresponding to the first virtual object on the basis of a positional relation between the first virtual object and the second virtual object. The output service provision method can include a first storage step of storing first object information regarding a shape and disposed position of the first virtual object in first storage means in a manner corresponding to the output device, a second storage step of storing second object information regarding a shape and disposed position of the second virtual object in second storage means in a manner corresponding to the mobile object, and a positional information acquisition step of acquiring positional information specifying the position of the mobile object. The method can further include an object information update step of updating the second object information in the second storage device on the basis of the positional information acquired at the positional information acquisition step, an overlap determination step of determining, on the basis of the first object information in the first storage device and the second object information in the second storage device, whether an area specified by the shape and disposed position of the first virtual object is overlapped with an area specified by the shape and disposed position of the second virtual object, and an output service provision step of providing the output service associated with the output of the output device corresponding to the first virtual object if the result of determination at the overlap determination step is overlap.

Further, in accordance with the present invention, there is provided an output service provision method for allowing a first virtual object corresponding to an output device and allowing a second virtual object corresponding to a mobile object, respectively, arranging the first virtual object in a virtual space corresponding to a real space and arranging the second virtual object at a position of the mobile object in the virtual space or the vicinity thereof, respectively, and providing an output service associated with an output of the output device corresponding to the first virtual object on the basis of a positional relation between the first virtual object and the second virtual object. The output service provision method including a first storage step of storing first object information regarding the first virtual object in first storage device in a manner corresponding to the output device, a second storage step of storing second object information regarding the second virtual object in second storage device in a manner corresponding to the mobile object, a positional relation determination step of determining, on the basis of the first object information in the first storage device and the second object information in the second storage device, whether the positional relation between the first virtual object and the second virtual object satisfies a predetermined condition, an output service provision step of providing the output service associated with the output of the output device corresponding to the first virtual object if the result of determination at the positional relation determination step is that the predetermined condition is satisfied, an input step of receiving input contents regarding creation, deletion, or update of the first object information, and an object information processing step of creating, deleting, or updating the first object information on the basis of the input contents received at the input step.

BRIEF DESCRIPTION OF THE DRAWINGS

The invention will be described with reference to the accompanying drawings, wherein like numerals reference like elements, and wherein:

FIG. 1 is a view showing the structure of a network system to which the present invention is applied;

FIG. 2 is a block diagram showing the structure of a virtual object management device 100;

FIG. 3 is a view showing a data structure of a virtual object management table 400;

FIG. 4 is a view showing a data structure of a communication information registration table 500;

FIG. 5 is a flow chart illustrating a virtual object creation process;

FIG. 6 is a flow chart illustrating a virtual object deletion process;

FIG. 7 is a flow chart illustrating a virtual object update process;

FIG. 8 is a flow chart illustrating an object information update process;

FIG. 9 is a flow chart illustrating an area-in notification process;

FIG. 10 is a flow chart illustrating an area-out notification process;

FIG. 11 is a block diagram showing the structure of a virtual object setting device 120;

FIG. 12 is a flow chart illustrating a virtual object creation request process;

FIG. 13 is a flow chart illustrating a virtual object deletion request process;

FIG. 14 is a flow chart illustrating a virtual object update request process;

FIG. 15 is a block diagram showing the structure of a projector 200;

FIG. 16 is a flow chart illustrating an area-in notification response process;

FIG. 17 is a flow chart illustrating an area-out notification response process;

FIG. 18 is a block diagram showing the structure of a portable terminal 140;

FIG. 19 is a flow chart illustrating a positional information notification process;

FIG. 20 is a flow chart illustrating a service linkage process;

FIG. 21 is a flow chart illustrating a projector display data transmission process;

FIG. 22 is a view showing the structure of a network system to which the present invention is applied;

FIG. 23 is a view showing a data structure of the virtual object management table 400; and FIG. 24 is a view showing a data structure of the communication information registration table 500.

DETAILED DESCRIPTION OF PREFERRED EMBODIMENTS

Now, a first embodiment of the present invention will be described with reference to the accompanying drawings. FIGS. 1 to 21 are views showing an output service provision system, a virtual object management terminal, a mobile object, a virtual object management terminal program, a mobile object program, and an output service provision method in accordance with the first embodiment of the present invention.

In the output service provision system, the virtual object management terminal, the mobile object, the virtual object management terminal program, the mobile object program, and the output service provision method in accordance with the first embodiment of the present invention, as shown in FIG. 1, in a presentation meeting place, a sphere-shaped virtual object A and virtual object B are disposed and set respectively in an area surrounding a projector 200 and an area surrounding a portable terminal 140 used by a presenter by a virtual object setting device 120, and a projection service by the projector 200 is initiated on the basis of projector display data of the portable terminal 140 when the virtual objects A and B overlap with each other.

First, the structure of a network system to which the present invention is applied will be described with reference to FIG. 1. FIG. 1 is a view showing the structure of the network system to which the present invention is applied.

In FIG. 1, installed on a wall of the presentation meeting place are a virtual object management device 100 for managing the virtual objects, and a service linkage management device 240 for managing an inter-device service linkage.

Further installed in the presentation meeting place are the projector 200 used for presentations, and a printer 220 for printing presentation data. Also provided in the presentation meeting place are the virtual object setting device 120 for arranging and setting the virtual objects, and the portable terminal 140, such as a personal digital assistant (PDA), used by the presenter. The virtual object setting device 120 may preferably be a PDA or the like, which is used by a presentation meeting promoter in the present embodiment.

Further, the virtual object management device 100, the virtual object setting device 120, the portable terminal 140, the projector 200, the printer 220, and the service linkage management device 240 are configured to be communicatable with one another in a wireless communication manner. In detail, the virtual object management device 100 communicates with the virtual object setting device 120, the portable terminal 140, the projector 200, the printer 220, and the service linkage management device 240; the portable terminal 140 communicates with the virtual object management device 100, the projector 200, the printer 220, and the service linkage management device 240; the projector 200 and the printer 220 communicate with the virtual object management device 100, the portable terminal 140, and the service linkage management device 240.

On the other hand, the sphere-shaped virtual object A is set in an area surrounding the projector 200; the sphere-shaped virtual object B is set in an area surrounding the portable terminal 140; a sphere-shaped virtual object C is set in an area surrounding the printer 220. These virtual objects are logical areas managed by the virtual object management device 100, which are set by the virtual object setting device 120 in a manner as will be described in detail below.

The service linkage management device 240 can include a storage unit for storing communication object data for establishment of communications with the virtual object setting device 120, the portable terminal 140, the projector 200, and the printer 220. The service linkage management device 240 is adapted to read and transmit the communication object data from the storage unit in response to requests from the respective devices. Stored in the storage unit are communication object data A for establishment of communication with the projector 200, communication object data B for establishment of communication with the virtual object setting device 120, communication object data C for establishment of communication with the portable terminal 140, and communication object data D for establishment of communication with the printer 220. For example, the portable terminal 140 establishes communication with the projector 200 by acquiring the communication object data A from the service linkage management device 240 and executing a communication establishment process on the basis of the acquired communication object data A. That is, each of the communication object data A~D functions as a driver for establishment of communication with a specific counterpart.

Next, a detailed description will be given of the structure of the virtual object management device 100 with reference to FIG. 2. FIG. 2 is an exemplary block diagram showing the structure of the virtual object management device 100.

The virtual object management device 100 can include, as shown in FIG. 2, a CPU 30 for, on the basis of a control program, performing a computing operation and controlling the entire system, a ROM 32 for pre-storing the control program, etc. of the CPU 30 in a predetermined area thereof, a RAM 34 for storing data read from the ROM 32, etc. or operation results necessary to the computing operation of the CPU 30, and an I/F 38 for interfacing input/output data with external devices. These components are interconnected via a bus 39, which is a signal line for transfer of data, such that they exchange data with one another over the bus 39.

Connected to the I/F 38 are, as the external devices, a wireless communication device 40 for communicating with the virtual object setting device 120, the portable terminal 140, the projector 200, the printer 220, and the service linkage management device 240 in a wireless communication manner, a virtual object management database (referred to hereinafter as a DB) 42 for registering and managing object information regarding the virtual objects, and a display device 44 for displaying an image on the basis of an image signal.

The virtual object management DB 42 stores a virtual object management table 400 capable of registering object information regarding the shapes and disposed positions of the virtual objects in a manner corresponding to service information prescribing service contents, as shown in FIG. 3. FIG. 3 is a view showing an exemplary data structure of the virtual object management table 400.

The virtual object management table 400 is configured to be capable of registering one record for each of the virtual objects, as shown in FIG. 3. Each record includes a field 402 for registering a serial number, a field 404 for registering a type of a service based on a device such as the projector 200 or etc., a field 406 for registering a service ID specifying the service, a field 408 for registering coordinates indicative of the disposed position of the corresponding virtual object in the virtual space corresponding to the real space, a field 410 for registering the shape of the corresponding virtual object, a field 412 for registering the size of the corresponding virtual object, and a field 414 for registering area-in management information for management of an inter-service linkage. Here, data of the fields 404 and 406 correspond to service information, and data of the fields 408 to 412 correspond to object information.

In the first-stage record in the example of FIG. 3, "1" is registered as the serial number in the field 402, "projector service" as the service type in the field 404, "0001" as the service ID in the field 406, "(10,50,20)" as the coordinates in the field 408, "sphere" as the shape in the field 410, and "2[m]" as the size in the field 412, respectively. This first-stage record signifies that the virtual object A is virtually disposed as a spherical shape having a radius of 2[m] about coordinates (10,50,20) in the real space where the projector 200 is installed, and the projection service by the projector 260 is carried out in the internal area of the virtual object A specified by the disposed position and shape.

In the third-stage record in FIG. 3, "3" is registered as the serial number in the field 402, "PDA service 2" as the service type in the field 404, "0003" as the service ID in the field 406, "(30,40,20)" as the coordinates in the field 408, "sphere" as the shape in the field 410, and "1[m]" as the size in the field 412, respectively. This third-stage record signifies that the virtual object B is virtually disposed as a spherical shape having a radius of 1[m] about coordinates (30,40,20) in the real space where the portable terminal 140 is present, and a service by the portable terminal 140 is carried out in the internal area of the virtual object B specified by the disposed position and shape. Note that the coordinates in the real space where the portable terminal 140 exists are changeable momentarily. In this regard, for the PDA service 2, positional information is acquired from the portable terminal 140, and the coordinates in the field 408 are updated on the basis of the acquired positional information. For example, in the case where the area of the virtual object A and the area of the virtual object B overlap with each other, the projector service and the PDA service 2 are linked to each other and the projector 200 and the portable terminal 140 are interoperable with each other.

The virtual object management DB 42 can further store a communication information registration table 500 for registering communication information specifying communication object data to be acquired from the service linkage management device 240 for service use with respect to each service to be used, as shown in FIG. 4. FIG. 4 is a view showing an exemplary data structure of the communication information registration table 500.

The communication information registration table 500 is configured to register one record for each service, as shown in FIG. 4. Each record includes a field 502 for registering a service ID, a field 504 for registering a service type, and a field 506 for registering communication information. Notably, the communication information registration table 500 is stored in storage units of not only the virtual object management device 100 but also the portable terminal 140, the projector 200, the printer 220, and the service linkage management device 240.

In the first-stage record in the example of FIG. 4, "0001" is registered as the service ID in the field 502, "projector service" as the service type in the field 504, and "communication object data A" as the communication information in the field 506, respectively. This first-stage record signifies that communication object data to be acquired from the service linkage management device 240 for use of the project service is the communication object data A.

The CPU 30 may preferably be a micro processing unit (MPU), etc. which runs a predetermined program stored in a predetermined area of the ROM 32 to execute a virtual object creation process, virtual object deletion process, virtual object update process, object information update process, area-in notification process, and area-out notification process shown respectively in flow charts of FIGS. 5 to 10 in a time division manner.

First, the virtual object creation process will be described in detail with reference to FIG. 5. FIG. 5 is a flow chart illustrating an exemplary virtual object creation process.

The virtual object creation process is executed by the CPU 30 to dispose and set a virtual object in response to a creation request from the virtual object setting device 120. In this virtual object creation process, it first proceeds to step S112, as shown in FIG. 5.

At step S112, it is determined whether a virtual object creation request has been received. Upon determining at step S112 that the creation request has been received (Yes), the process proceeds to step S114. In the case where no virtual object creation request is determined to have been received at step S112 (No), it waits at step S112 until a virtual object creation request is received.

At step S114, object information and service information are received, and then it proceeds to step S116 to register the received object information in the virtual object management table 400 in a manner corresponding to the received service information. At step S118, a virtual object creation completion notification is transmitted to the virtual object setting device 120, and it ends a sequence of processes and then returns to the original process.

Next, the virtual object deletion process will be described in detail with reference to FIG. 6. FIG. 6 is a flow chart illustrating an exemplary virtual object deletion process.

The virtual object deletion process is executed by the CPU 30 to delete a virtual object in response to a deletion request from the virtual object setting device 120. In this virtual object deletion process, the process first proceeds to step S206, as shown in FIG. 6.

At step S206, it is determined whether a virtual object deletion request has been received. If it is determined at step S206 that the deletion request has been received (Yes), the process proceeds to step S208. In the case where no virtual object deletion request is determined to have been received at step S206 (No), the process waits at step S206 until a virtual object deletion request is received.

At step S208, positional information is received, and then it proceeds to step S210 to search the virtual object management table 400 on the basis of the received positional information to extract the corresponding object information therefrom. In detail, at step S208, the process extracts object information of a virtual object existing within a predetermined range (for example, 10[m]) on the basis of the position of the virtual object setting device 120, specified by the positional information. Here, the virtual object of the extracted object information is a target to be deleted. In other words, in order to delete a desired virtual object, the virtual object setting device 120 must move to within the internal area of the virtual object or the vicinity thereof.

Thereafter, the process proceeds to step S211 to draw up a list of virtual objects, including the virtual object to be deleted, on the basis of the extracted object information, and then proceeds to step S212. At step S212, the process transmits the drawn-up virtual object list to the virtual object setting device 120, and then proceeds to step S222.

At step S222, it is determined whether a virtual object deletion request based on the virtual object list has been received. If it is determined at step S222 that the deletion request has been received (Yes), it deletes the object information and service information of the virtual object selected as a target to be deleted, at step S224, and then returns to step S222.

On the other hand, in the case where it is determined at step S222 that no virtual object deletion request has been received (No), it proceeds to step S230 to determine whether a virtual object deletion end request has been received. Upon determining at step S230 that the deletion end request has been received (Yes), the process can proceed to step S232 to transmit a virtual object deletion completion notification to the virtual object setting device 120, end a sequence of processes and return to the original process.

On the other hand, if it is determined at step S230 that no virtual object deletion end request has been received (No), it returns to step S222.

Next, the virtual object update process will be described in detail with reference to FIG. 7. FIG. 7 is a flow chart illustrating an exemplary virtual object update process.

The virtual object update process is executed by the CPU 30 to update a virtual object in response to an update request from the virtual object setting device 120. In this virtual object update process, it first proceeds to step S306, as shown in FIG. 7.

At step S306, it is determined whether a virtual object update request has been received. If it is determined at step S306 that the update request has been received (Yes), it proceeds to step S308. In the case where no virtual object update request is determined to have been received at step S306 (No), it waits at step S306 until a virtual object update request is received.

At step S308, positional information is received, and then it proceeds to step S310 to search the virtual object management table 400 on the basis of the received positional information to extract the corresponding object information therefrom. In detail, at step S308, it extracts object information of a virtual object existing within a predetermined range on the basis of the position of the virtual object setting device 120, specified by the positional information. Here, the virtual object of the extracted object information is a target to be updated. In other words, in order to update a desired virtual object, the virtual object setting device 120 must move to within the internal area of the virtual object or the vicinity thereof.

Subsequently, it proceeds to step S311 to draw up a list of virtual objects, including the virtual object to be updated, on the basis of the extracted object information, and then it proceeds to step S312. At step S312, it transmits the drawn-up virtual object list to the virtual object setting device 120, and then proceeds to step S328.

At step S328, it determines whether a virtual object update request based on the virtual object list has been received. If it is determined at step S328 that the update request has been received (Yes), it proceeds to step S330 to receive object information and service information. Then, at step S332, it updates the object information and service information of the virtual object selected as a target to be updated on the basis of the received object information and service information, and then returns to step S328.

On the other hand, in the case where it is determined at step S328 that no virtual object update request has been received (No), it proceeds to step S338 to determine whether a virtual object update end request has been received. Upon determining at step S338 that the update end request has been received (Yes), it proceeds to step S340 to transmits a virtual object update completion notification to the virtual object setting device 120, end a sequence of processes and return to the original process.

On the other hand, if it is determined at step S338 that no virtual object update end request has been received (No), it returns to step S328.

Next, the object information update process will be described in detail with refrence to FIG. 8. FIG. 8 is a flow chart illustrating an exemplary object information update process.

The object information update process is executed by the CPU 30 to update the disposed position of the virtual object B on the basis of positional information from the portable terminal 140. In this object information update process, it first proceeds to step S404, as shown in FIG. 8.

At step S404, it is determined whether positional information has been received. Upon determining at step S404 that the positional information has been received (Yes), the process proceeds to step S406. In the case where no positional information is determined to have been received at step S404 (No), it waits at step S404 until positional information received.

At step S406, it updates the coordinates in the field 408 of the virtual object management table 400 for the PDA service 2 on the basis of the received positional information and then proceeds to step S408 to notify the portable terminal 140 of a positional information reception response, end a sequence of processes and then return to the original process.

Next, the area-in notification process will be described in detail with reference to FIG. 9. FIG. 9 is a flow chart illustrating an exemplary area-in notification process.

The area-in notification process is executed by the CPU 30 to notify each device of the overlap of the area of one of two virtual objects with the area of the other. In this area-in notification process, it first proceeds to step S500, as shown in FIG. 9.

At step S500, it reads a record (referred to hereinafter as object information and service information of the portable terminal 140 in this process) regarding the PDA service 2 from the virtual object management table 400 and then proceeds to step S502. At step S502, the process can read an initial record (referred to hereinafter as object information and service information of a target device in this process) from the virtual object management table 400 and then proceeds to step S504.

At step S504, it is determined, on the basis of the object information of the portable terminal 140 and the object information of the target device, whether an area specified by the shape and disposed position of the virtual object B has overlapped with an area specified by the shape and disposed position of a virtual object corresponding to the target device. Upon determining at step S504 that the two areas have overlapped with each other (referred to hereinafter as an area-in state) (Yes), it proceeds to step SS06.

At step S506, it reads communication information from the communication information registration table 500 on the basis of the service information of the target device, acquires communication object data of a corresponding service from the service linkage management device 240 on the basis of the read communication information and then proceeds to step S508. At step S508, the process establishes communication with the target device by executing a communication establishment process on the basis of the acquired communication object data, notifies the target device of the area-in state and then proceeds to step S540.

At step S540, it is determined whether a response to the area-in notification has been received. Upon determining at step S540 that the area-in notification response has been received (Yes), it proceeds to step S542. If it is determined at step S540 that no response to the area-in notification has been received (No), it waits at step S540 until a response to the area-in notification is received.

At step S542, it registers a service ID of the corresponding service in areain management information of the PDA service 2 and then proceeds to step S544 to determine whether the process of steps S504 to S542 has been ended with respect to all services registered in the virtual object management table 400. If the process of steps S504 to S542 is determined to have been ended at step S544 (Yes), it ends a sequence of processes and then returns to the original process.

On the other hand, upon determining at step S544 that the process of steps S504 to S542 has not been ended with respect to all the services (No), it proceeds to step S546 to read a next record from the virtual object management table 400 and then return to step S504.

And, in the case where it is determined at step S504 that the two areas are not in the area-in state (No), it proceeds to step S544.

Next, the area-out notification process will be described in detail with reference to FIG. 10. FIG. 10 is a flow chart illustrating an exemplary area-out notification process.

The area-out notification process is executed by the CPU 30 to notify each device that the overlap of the area of one of two virtual objects with the area of the other has been released. In this area-out notification process, it first proceeds to step S600, as shown in FIG. 10.

At step S600, it reads a record (referred to hereinafter as object information and service information of the portable terminal 140 in this process) regarding the PDA service 2 from the virtual object management table 400 and then proceeds to step S602. At step S602, the process can read an initial service ID from the area-in management information of the PDA service 2 and then proceeds to step S604. At step S604, it reads a record (referred to hereinafter as object information and service information of a target device in this process) regarding a service corresponding to the read service ID from the virtual object management table 400 and then proceeds to step S606.

At step S606, it determines, on the basis of the object information of the portable terminal 140 and the object information of the target device, whether an area specified by the shape and disposed position of the virtual object B has not overlapped with an area specified by the shape and disposed position of a virtual object corresponding to the target device. Upon determining at step S606 that the two areas have not overlapped with each other (referred to hereinafter as an area-out state) (Yes), it proceeds to step S608.

At step S608, it reads communication information from the communication information registration table 500 on the basis of the service information of the target device, acquires communication object data of the corresponding service from the service linkage management device 240 on the basis of the read communication information and then proceeds to step S610. At step S610, it establishes communication with the target device by executing a communication establishment process on the basis of the acquired communication object data, notifies the target device of the area-out state and then proceeds to step S626.

At step S626, it determines whether a response to the area-out notification has been received. Upon determining at step S626 that the area-out notification response has been received (Yes), it proceeds to step S628. If it is determined at step S626 that no response to the area-out notification has been received (No), it waits at step S626 until a response to the area-out notification is received.

At step S628, it deletes the service ID of the corresponding service from the area-in management information of the PDA service 2 and then proceeds to step S630 to determine whether the process of steps S604 to S628 has been ended with respect to all services registered in the area-in management information of the PDA service 2. If the process of steps S604 to S628 is determined to have been ended at step S630 (Yes), it ends a sequence of processes and then returns to the original process.

On the other hand, upon determining at step S630 that the process of steps S604 to S628 has not been ended with respect to all the services (No), it proceeds to step S632 to read a next service D from the area-in management information of the PDA service 2 and then return to step S604.

And, in the case where it is determined at step S606 that the two areas are not in the area-out state (No), it proceeds to step S630.

Next, the structure of the virtual object setting device 120 will be described in detail with reference to FIG. 11. FIG. 11 is an exemplary block diagram showing the structure of the virtual object setting device 120.

The virtual object setting device 120 includes, as shown in FIG. 11, a CPU 50 for, on the basis of a control program, performing a computing operation and controlling the entire system, a ROM 52 for pre-storing the control program, etc. of the CPU 50 in a predetermined area thereof, a RAM 54 for storing data read from the ROM 52, etc. or operation results necessary to the computing operation of the CPU 50, and an I/F 58 for interfacing input/output data with external devices. These components are interconnected via a bus 59, which is a signal line for transfer of data, such that they exchange data with one another over the bus 59.

Connected to the I/F 58 are, as the external devices, a wireless communication device 60 for communicating with the virtual object management device 100 in a wireless communication manner, a key panel 62 as a human interface for enabling the input of data by a plurality of keys, a liquid crystal display (LCD) 64 for displaying an image on the basis of an image signal, and a positional information acquisition device 66 for measuring the current position of the virtual object setting device 120 to acquire positional information specifying the current position.

The positional information acquisition device 66 is adapted to measure the current position of the virtual object setting device 120 using a GPS, which receives time signals indicative of the current time transmitted from orbiting satellites and measures a position on the basis of a time deviation based on the received time signals and orbits of the respective orbiting satellites, and output the measured current position as positional information.

The CPU 50 may preferably be a micro processing unit (MPU), etc. which runs a predetermined program stored in a predetermined area of the ROM 52 to execute a virtual object creation request process, virtual object deletion request process, and virtual object update request process shown respectively in flow charts of FIGS. 12 to 14 in a time division manner.

First, the virtual object creation request process will be described in detail with reference to FIG. 12. FIG. 12 is a flow chart illustrating an exemplary virtual object creation request process.

The virtual object creation request process is a process which corresponds to the virtual object creation process of FIG. 5 and requests the virtual object management device 100 to create a virtual object. In this virtual object creation request process, upon executing by the CPU 50, it first proceeds to step S100, as shown in FIG. 12.

At step S100, it is determined whether a virtual object creation command has been received from a user of the virtual object setting device 120. Upon determining at step S100 that the virtual object creation command has been received (Yes), the process proceeds to step S102. In the case where no virtual object creation command is determined to have been received at step S100 (No), it waits at step S100 until a virtual object creation command is received.

At step S102, it acquires positional information from the positional information acquisition device 66 and then proceeds to step S104 to select a service type corresponding to a desired virtual object from among a plurality of service types by the key panel 62.

Thereafter, the process proceeds to step S106 to input the shape and size of the virtual object from the key panel 62 and then proceeds to step S108. At step S108, it generates object information and service information on the basis of the acquired positional information and the results selected and inputted respectively at steps S104 and S106, and then proceeds to step S110. At step S 110, it transmits the generated object information and service information to the virtual object management device 100 along with a virtual object creation request, and then proceeds to step S120.

At step S120, it is determined whether a virtual object creation completion notification has been received. Upon determining at step S120 that the creation completion notification has been received (Yes), it proceeds to step S122 to display a message indicative of the virtual object creation completion on the LCD 64, end a sequence of processes and then return to the original process.

On the other hand, in the case where it is determined at step S120 that no virtual object creation completion notification has been received (No), it waits at step S120 until a virtual object creation completion notification is received.

Next, the virtual object deletion request process will be described in detail with reference to FIG. 13. FIG. 13 is a flow chart illustrating an exemplary virtual object deletion request process.

The virtual object deletion request process is a process which corresponds to the virtual object deletion process of FIG. 6 and requests the virtual object management device 100 to delete a virtual object. In this virtual object deletion request process, upon executing by the CPU 50, it first proceeds to step S200, as shown in FIG. 13.

At step S200, it is determined whether a virtual object deletion command has been received from the user of the virtual object setting device 120. Upon determining at step S200 that the virtual object deletion command has been received (Yes), the process proceeds to step S202. In the case where no virtual object deletion command is determined to have been received at step S200 (No), it waits at step S200 until a virtual object deletion command is received.

At step S202, the process acquires positional information from the positional information acquisition device 66 and then proceeds to step S204. At step S204, it transmits the acquired positional information to the virtual object management device 100 together with a virtual object deletion request and then proceeds to step S214.

At step S214, it is determined whether a list of virtual objects has been received. If it is determined at step S214 that the virtual object list has been received (Yes), it displays the received virtual object list on the LCD 64 at step S216 and then proceeds to step S218.

At step S218, it is determined whether a virtual object to be deleted has been selected from the virtual object list. Upon determining at step S218 that the virtual object to be deleted has been selected (Yes), it transmits a virtual object deletion request based on the virtual object list to the virtual object management device 100 at step S220 and then returns to step S218.

On the other hand, in the case where it is determined at step S218 that no virtual object to be deleted has been selected (No), it proceeds to step S226 to determine whether a virtual object update end command has been received from the user. If it is determined at step S226 that the virtual object update end command has been received (Yes), it transmits a virtual object deletion end request to the virtual object management device 100 at step S228 and then proceeds to step S234.

At step S234, it is determined whether a virtual object deletion completion notification has been received. Upon determining at step S234 that the deletion completion notification has been received (Yes), it proceeds to step S236. At step S236, it displays a message indicative of the virtual object deletion completion on the LCD 64, ends a sequence of processes and then returns to the original process.

On the other hand, in the case where it is determined at step S234 that no virtual object deletion completion notification has been received (No), it waits at step S234 until a virtual object deletion completion notification is received.

On the other hand, if it is determined at step S226 that no virtual object update end command has been received (No), it returns to step S218.

And, if it is determined at step S214 that no virtual object list has been received (No), it waits at step S214 until a list of virtual objects is received.

Next, the virtual object update request process will be described in detail with reference to FIG. 14. FIG. 14 is a flow chart illustrating an exemplary virtual object update request process.

The virtual object update request process is a process which corresponds to the virtual object update process of FIG. 7 and requests the virtual object management device 100 to update a virtual object. In this virtual object update request process, upon executing by the CPU 50, it first proceeds to step S300, as shown in FIG. 14.

At step S300, it is determined whether a virtual object update command has been received from the user. Upon determining at step S300 that the virtual object update command has been received (Yes), it proceeds to step S302. In the case where no virtual object update command is determined to have been received at step S300 (No), it waits at step S300 until a virtual object update command is received.

At step S302, it acquires positional information from the positional information acquisition device 66 and then proceeds to step S304. At step S304, it transmits the acquired positional information to the virtual object management device 100 together with a virtual object update request and then proceeds to step S314.

At step S314, it is determined whether a list of virtual objects has been received. If it is determined at step S314 that the virtual object list has been received (Yes), it displays the received virtual object list on the LCD 64 at step S316 and then proceeds to step S318.

At step S318, it is determined whether a virtual object to be updated has been selected from the virtual object list. Upon determining at step S318 that the virtual object to be updated has been selected (Yes), it proceeds to step S320 to select a service type corresponding to the selected virtual object from among a plurality of service types. At step S322, it inputs the shape and size of the virtual object from the key panel 62 and then proceeds to step S324 to generate object information and service information on the basis of the acquired positional information and the results selected and inputted respectively at steps S320 and S322. At step S326, it transmits the generated object information and service information to the virtual object management device 100 along with a virtual object update request based on the virtual object list, and then returns to step S318.

On the other hand, in the case where it is determined at step S318 that no virtual object to be updated has been selected (No), it proceeds to step S334 to determine whether a virtual object update end command has been received from the user. If it is determined at step S334 that the virtual object update end command has been received (Yes), it transmits a virtual object update end request to the virtual object management device 100 at step S336 and then proceeds to step S342.

At step S342, it is determined whether a virtual object update completion notification has been received. Upon determining at step S342 that the update completion notification has been received (Yes), it proceeds to step S344. At step S344, it displays a message indicative of the virtual object update completion on the LCD 64, ends a sequence of processes, and then returns to the original process.

On the other hand, in the case where it is determined at step S342 that no virtual object update completion notification has been received (No), it waits at step S342 until a virtual object update completion notification is received.

If it is determined at step S334 that no virtual object update end command has been received (No), it returns to step S318.

And if it is determined at step S314 that no virtual object list has been received (No), it waits at step S314 until a list of virtual objects is received.

Next, a detailed description will be given of the structure of the projector 200 with reference to FIG. 15. FIG. 15 is an exemplary block diagram showing the structure of the projector 200.

The projector 200 can include, as shown in FIG. 15, a CPU 70 for, on the basis of a control program, performing a computing operation and controlling the entire system, a ROM 72 for pre-storing the control program, etc. of the CPU 70 in a predetermined area thereof, a RAM 74 for storing data read from the ROM 72, etc. or operation results necessary to the computing operation of the CPU 70, and an I/F 78 for interfacing input/output data with external devices. These components are interconnected via a bus 79, which is a signal line for transfer of data, such that they exchange data with one another over the bus 79.

Connected to the I/F 78 are, as the external devices, a wireless communication device 80 for communicating with the virtual object management device 100, portable terminal 140, and service linkage management device 240 in a wireless communication manner, and a projection device 82 for projecting an image onto a screen on the basis of an image signal.

The CPU 70 may preferably be a micro processing unit (MPU), etc. which runs a predetermined program stored in a predetermined area of the ROM 72 to execute an area-in notification response process and area-out notification response process shown respectively in flow charts of FIGS. 16 and 17 in a time division manner.

First, the area-in notification response process will be described in detail with reference to FIG. 16. FIG. 16 is a flow chart illustrating an exemplary area-in notification response process.

The area-in notification response process corresponds to the area-in notification process of FIG. 9. In this area-in notification response process, upon executing by the CPU 70, it first proceeds to step S510, as shown in FIG. 16.

At step S510, it is determined whether an area-in notification has been received. Upon determining at step S510 that the area-in notification has been received (Yes), it proceeds to step S512. If it is determined at step S510 that no area-in notification has been received (No), it waits at step S510 until an area-in notification is received.

At step S512, it is determined whether a service associated with the received area-in notification is the PDA service 2. If it is determined at step S512 that the service associated with the received area-in notification is the PDA service 2 (Yes), it proceeds to step S514 to read communication information of the PDA service 2 from the communication information registration table 500 and acquire communication object data C from the service linkage management device 240 on the basis of the read communication information. At step S516, it establishes communication with the portable terminal 140 by executing a communication establishment process on the basis of the acquired communication object data C, transmits a service linkage initiation request to the portable terminal 140, and then proceeds to step S524. At step S524, it transmits a projector display data transmission request to the portable terminal 140 and then proceeds to step S534.

At step S534, it is determined whether projector display data has been received. Upon determining at step S534 that the projector display data has been received (Yes), the process proceeds to step S536. In the case where no projector display data is determined to have been received at step S534 (No), it waits at step S534 until projector display data is received.

At step S536, it executes a projection process by the projection device 82 on the basis of the received projector display data and then proceeds to step S538. At step S538, it notifies the virtual object management device 100 of a response to the area-in notification reception, ends a sequence of processes, and then returns to the original process.

On the other hand, in the case where it is determined at step S512 that the service associated with the received area-in notification is not the PDA service 2 (No), it proceeds to step S548 to read communication information of a corresponding service from the communication information registration table 500 and acquire communication object data of the corresponding service from the service linkage management device 240 on the basis of the read communication information. At step S550, it establishes communication with a target device of the corresponding service by executing a communication establishment process on the basis of the acquired communication object data, transmits a service linkage initiation request to the target device of the corresponding service, and then proceeds to step S552. At step S552, it executes a service linkage process and then proceeds to step S538.

Next, the area-out notification response process will be described in detail with reference to FIG. 17. FIG. 17 is a flow chart illustrating an exemplary area-out notification response process.

The area-out notification response process corresponds to the area-out notification process of FIG. 10. In this area-out notification response process, upon executing by the CPU 70, it first proceeds to step S612, as shown in FIG. 17.

At step S612, it is determined whether an area-out notification has been received. Upon determining at step S612 that the area-out notification has been received (Yes), it proceeds to step S614. If it is determined at step S612 that no area-out notification has been received (No), it waits at step S612 until an area-out notification is received.

At step S614, it is determined whether a service associated with the received area-out notification is the PDA service 2. If it is determined at step S614 that the service associated with the received area-out notification is the PDA service 2 (Yes), it proceeds to step S616 to read communication information of the PDA service 2 from the communication information registration table 500 and acquire communication object data C from the service linkage management device 240 on the basis of the read communication information. At step S618, it establishes communication with the portable terminal 140 by executing a communication establishment process on the basis of the acquired communication object data C, transmits a service linkage termination request to the portable terminal 140, and then proceeds to step S624. At step S624, it transmits a response to the area-out notification reception to the virtual object management device 100, ends a sequence of processes, and then returns to the original process.

On the other hand, in the case where it is determined at step S614 that the service associated with the received area-out notification is not the PDA service 2 (No), it proceeds to step S634 to read communication information of a corresponding service from the communication information registration table 500 and acquire communication object data of the corresponding service from the service linkage management device 240 on the basis of the read communication information. At step S636, the process can establish communication with a target device of the corresponding service by executing a communication establishment process on the basis of the acquired communication object data, transmits a service linkage termination request to the target device of the corresponding service, and then proceeds to step S624.

Next, the structure of the printer 220 will be described in detail.

The printer 220 is substantially the same in structure as the projector 200, with the exception that a printing device is provided instead of the projection device 82. The operation of the printer 220 is controlled by a CPU installed therein, and it is also the same as that of the projector 200, with the exception that a printing process is executed instead of the projection process of step S536.

Next, the structure of the portable terminal 140 will be described in detail with reference to FIG. 18. FIG. 18 is an exemplary block diagram showing the structure of the portable terminal 140.

The portable terminal 140 includes, as shown in FIG. 18, a CPU 90 for, on the basis of a control program, performing a computing operation and controlling the entire system, a ROM 92 for pre-storing the control program, etc. of the CPU 90 in a predetermined area thereof, a RAM 94 for storing data read from the ROM 92, etc. or operation results necessary to the computing operation of the CPU 90, and an I/F 98 for interfacing input/output data with external devices. These components are interconnected via a bus 99, which is a signal line for transfer of data, such that they exchange data with one another over the bus 99.

Connected to the I/F 98 are, as the external devices, a wireless communication device 83 for communicating with the virtual object management device 100, projector 200, printer 220, and service linkage management device 240 in a wireless communication manner, a key panel 84 as a human interface for enabling the input of data by a plurality of keys, an LCD 85 for displaying an image on the basis of an image signal, and a positional information acquisition device 86 for measuring the current position of the portable terminal 140 to acquire positional information specifying the current position.

The positional information acquisition device 86 is adapted to measure the current position of the portable terminal 140 using a GPS, which receives time signals indicative of the current time transmitted from orbiting satellites and measures a position on the basis of a time deviation based on the received time signals and orbits of the respective orbiting satellites, and output the measured current position as positional information.

The CPU 90 may preferably be a micro processing unit (MPU), etc. which runs a predetermined program stored in a predetermined area of the ROM 92 to execute a positional information notification process, service linkage process, and projector display data transmission process shown respectively in flow charts of FIGS. 19 to 21 in a time division manner.

First, the positional information notification process will be described in detail with reference to FIG. 19. FIG. 19 is a flow chart illustrating an exemplary positional information notification process.

The positional information notification process corresponds to the object information update process of FIG. 8. In this positional information notification process, upon executing by the CPU 90, it first proceeds to step S400, as shown in FIG. 19.

At step S400, it acquires positional information from the positional information acquisition device 86 and then proceeds to step S402. At step S402, it transmits the acquired positional information to the virtual object management device 100 and then proceeds to step S410.

At step S410, it is determined whether a response to the positional information transmission has been received. If it is determined at step S410 that the response has been received (Yes), it ends a sequence of processes and then returns to the original process. In the case where it is determined at step S410 that no response to the positional information transmission has been received (No), it waits at step S410 until a response to the positional information transmission is received.

Next, the service linkage process will be described in detail with reference to FIG. 20. FIG. 20 is a flow chart illustrating an exemplary service linkage process.

The service linkage process corresponds to the area-in notification response process and area-out notification response process of FIGS. 16 and 17. In this service linkage process, upon executing by the CPU 90, it first proceeds to step S518, as shown in FIG. 20.

At step S518, it is determined whether a service linkage initiation request has been received. Upon determining at step S518 that the service linkage initiation request has been received (Yes), it proceeds to step S520 to read communication information of a corresponding service associated with the received service linkage initiation request from the communication information registration table 500 and acquire communication object data of the corresponding service from the service linkage management device 240 on the basis of the read communication information. At step S522, it establishes communication with a target device of the corresponding service by executing a communication establishment process on the basis of the acquired communication object data, initiates linkage with the corresponding service, ends a sequence of processes and then returns to the original process.

On the other hand, in the case where it is determined at step S518, that no service linkage initiation request has been received (No), it proceeds to step S620 to determine whether a service linkage termination request has been received. Upon determining at step S620 that the service linkage termination request has been received (Yes), it proceeds to step S622 to terminate linkage with a corresponding service associated with the received service linkage termination request, end a sequence of processes and then return to the original process.

On the other hand, in the case where it is determined at step S620, that no service linkage termination request has been received (No), it returns to step S518.

Next, the projector display data transmission process will be described in detail with reference to FIG. 21. FIG. 21 is a flow chart illustrating an exemplary projector display data transmission process.

The projector display data transmission process corresponds to the area-in notification response process of FIG. 16. In this projector display data transmission process, upon executing by the CPU 90, it first proceeds to step S526, as shown in FIG. 21.

At step S526, it is determined whether service linkage is in progress. Upon determining at step S526 that service linkage is in progress (Yes), it proceeds to step S528. If it is determined at step S526 that service linkage is not in progress, it waits at step S526.

At step S528, it is determined whether a projector display data transmission request has been received. If it is determined at step S528 that the transmission request has been received (Yes), it proceeds to step S530. In the case where it is determined at step S528 that no projector display data transmission request has been received (No), it waits at step S528 until a projector display data transmission request is received.

At step S530, it reads projector display data from the RAM 94, etc. and then proceeds to step S532. At step S532, it transmits the read projector display data to a target device of a corresponding service, ends a sequence of processes and then returns to the original process.

Next, the operation of the first embodiment will be described.

First, a description will be given of the virtual object creation. The virtual object creation is conducted by the meeting promoter using the virtual object setting device 120. For example, in order to create the virtual object A corresponding to the projector 200, the meeting promoter first moves to an installed position of the projector 200 and then applies a virtual object creation command to the virtual object setting device 120.

The virtual object setting device 120 performs steps S102 and S104 in response to the virtual object creation command from the meeting promoter. Namely, the virtual object setting device 120 acquires positional information from the positional information acquisition device 66 and requests the meeting promoter to select a service type corresponding to the virtual object A. Here, in response to the selection request, the meeting promoter selects the service type corresponding to the virtual object A from among a plurality of service types. In this case, the meeting promoter selects "projector service" as the service type corresponding to the virtual object A because he/she desires to provide the projection service by the projector 200.

If the service type is selected, then the virtual object setting device 120 performs step S106. At step S106, the virtual object setting device 120 requests the meeting promoter to input information regarding the shape and size of the virtual object A. Here, the meeting promoter inputs the information regarding the shape and size of the virtual object A in response to the input request. In this case, because the meeting promoter desires to provide the projection service by the projector 200, he/she inputs a spherical shape having a center corresponding to the projector 200 or the vicinity thereof and a proper size including, for example, a range operable by the meeting promoter. In the example of FIG. 1, the virtual object A is set to have a spherical shape with a center corresponding to the projector 200.

If the shape and size of the virtual object A are inputted, then the virtual object setting device 120 performs steps S 108 and S 110. At steps S 108 and S110, the virtual object setting device 120 generates object information and service information on the basis of the acquired positional information and the results selected and inputted respectively at steps S104 and S106, and then transmits the generated object information and service information to the virtual object management device 100 along with a virtual object creation request.

The virtual object management device 100 performs steps S114 to S118 in response to the creation request. At steps S114 to S118, the virtual object management device 100 receives the object information and service information and registers the received object information in the virtual object management table 400 in a manner corresponding to the received service information. The virtual object management device 100 then transmits a virtual object A creation completion notification to the virtual object setting device 120.

Upon receiving the creation completion notification, the virtual object setting device 120 displays a message indicative of the virtual object A creation completion at step S122.

Although the creation of only the virtual object A has been disclosed, the virtual objects B and C can be created in the same manner.

Next, a description will be given of the case where the presenter gives a presentation using the projector 200. In order to conduct a presentation, the presenter stores projector display data for the presentation in the portable terminal 140 and moves within the meeting place while carrying the portable terminal 140. At this time, the portable terminal 140 performs steps S400 and S402. At steps S400 and S402, the portable terminal 140 acquires positional information from the positional information acquisition device 86 and transmits the acquired positional information to the virtual object management device 100.

Upon receiving the positional information, the virtual object management device 100 updates the coordinates in the field 408 of the virtual object management table 400 for the PDA service 2 on the basis of the received positional information at step S406 and notifies the portable terminal 140 of a response to the positional information reception at step S408.

Upon receiving the response to the positional information transmission, the portable terminal 140 transmits the positional information repeatedly at intervals of a predetermined period of time (for example, about 3 seconds). As a result, the disposed position of the virtual object B is updated with the movement of the portable terminal 140.

Next, the presenter brings the portable terminal 140 close to the projector 200 under the condition that the virtual objects A to C are set. Accordingly, if the virtual object B enters the area-in state with respect to the virtual object A, the virtual object management device 100 performs steps S500 to S506. At steps S500 to S506, the virtual object management device 100 reads communication information from the communication information registration table 500 on the basis of service information of the projector 200 and acquires communication object data A from the service linkage management device 240 on the basis of the read communication information. Then, at step S508, the virtual object management device 100 can establish communication with the projector 200 by executing a communication establishment process on the basis of the acquired communication object data A, and notifies the projector 200 of the area-in state.

Upon receiving the area-in notification, the projector 200 can recognize that a service associated with the received area-in notification is the PDA service 2, and then performs steps S512 and S514. At steps S512 and S514, the projector 200 reads communication information of the PDA service 2 from the communication information registration table 500 and acquires communication object data C from the service linkage management device 240 on the basis of the read communication information. Then, at steps S516 and S524, the projector 200 establishes communication with the portable terminal 140 by executing a communication establishment process on the basis of the acquired communication object data C, and transmits a service linkage initiation request and projector display data transmission request to the portable terminal 140.

The portable terminal 140 receives the service linkage initiation request and recognizes that a service associated with the received service linkage initiation request is the projector service. As a result, at step S520, the portable terminal 140 reads communication information of the projector service from the communication information registration table 500 and acquires communication object data A from the service linkage management device 240 on the basis of the read communication information. Then, at step S522, the portable terminal 140 establishes communication with the projector 200 by executing a communication establishment process on the basis of the acquired communication object data A, and initiates linkage with the projector service. Upon receiving the projector display data transmission request while the linkage with the projector service is in progress, the portable terminal 140 reads projector display data designated for the presentation at step S530 and transmits the read projector display data to the projector 200 at step S532.

Upon receiving the projector display data, the projector 200 executes a projection process by the projection device 82 on the basis of the received projector display data at step S536 and notifies the virtual object management device 100 of a response to the area-in notification reception at step S538.

The virtual object management device 100 receives the response to the area-in notification and registers a service ID of the projector service in the area-in management information of the PDA service 2 at step S542. The virtual object management device 100 then manages the linkage between the PDA service 2 and the projector service.

Next, in order to finish the presentation, the presenter departs from the projector 200 while carrying the portable terminal 140. Accordingly, if the virtual object B is separated from the virtual object A (i.e., the area-out state), the virtual object management device 100 performs steps S600 to S608. At steps S600 to S608, the virtual object management device 100 reads communication information from the communication information registration table 500 on the basis of the service information of the projector 200 and acquires communication object data A from the service linkage management device 240 on the basis of the read communication information. Then, at step S610, the virtual object management device 100 establishes communication with the projector 200 by executing a communication establishment process on the basis of the acquired communication object data A, and notifies the projector 200 of the area-out state.

Upon receiving the area-out notification, the projector 200 can recognize that a service associated with the received area-out notification is the PDA service 2, and then performs steps S614 and S616. At steps S614 and S616, the projector 200 reads communication information of the PDA service 2 from the communication information registration table 500 and acquires communication object data C from the service linkage management device 240 on the basis of the read communication information. Then, at step S618, the projector 200 establishes communication with the portable terminal 140 by executing a communication establishment process on the basis of the acquired communication object data C, and transmits a service linkage termination request to the portable terminal 140. At step S624, the projector 200 transmits a response to the area-out notification reception to the virtual object management device 100.

Upon receiving the service linkage termination request, the portable terminal 140 recognizes that a service associated with the received service linkage termination request is the projector service, and then terminates the linkage with the projector service at step S622.

On the other hand, the virtual object management device 100 receives the response to the area-out notification and deletes the service ID of the projector service from the area-in management information of the PDA service 2 at step S628. The virtual object management device 100 then manages the termination of linkage between the PDA service 2 and the projector service.

As described above, the projector display data of the portable terminal 140 is projected by the projector 200 by bringing the portable terminal 140 close to the projector 200 to allow the virtual object B to enter the area-in state with respect to the virtual object A. In a similar manner, the projector display data of the portable terminal 140 can be printed by the printer 220 by bringing the portable terminal 140 close to the printer 220 to allow the virtual object B to enter the area-in state with respect to the virtual object C.

Next, a description will be given of the virtual object deletion.

The virtual object deletion is conducted by the meeting promoter using the virtual object setting device 120. For example, in order to delete the virtual object A corresponding to the projector 200, the meeting promoter first moves to an installed position of the projector 200 and then applies a virtual object deletion command to the virtual object setting device 120.

The virtual object setting device 120 performs steps S202 and S204 in response to the virtual object deletion command from the meeting promoter. Namely, the virtual object setting device 120 acquires positional information from the positional information acquisition device 66 and transmits the acquired positional information to the virtual object management device 100 together with a virtual object deletion request.

In response to the deletion request, the virtual object management device 100 receives the positional information at step S208, and then searches the virtual object management table 400 on the basis of the received positional information to extract the corresponding object information therefrom at step S210. In this case, object information of the virtual object A is extracted due to the fact that the virtual object A exists in the vicinity of the virtual object setting device 120. Thereafter, the virtual object management device 100 draws up a list of virtual objects, including the virtual object A to be deleted, on the basis of the extracted object information at step S211 and transmits the drawn-up virtual object list to the virtual object setting device 120 at step S212.

Upon receiving the virtual object list, the virtual object setting device 120 performs step S216. At step S216, the virtual object setting device 120 displays the received virtual object list and requests the meeting promoter to select a virtual object to be deleted. At this time, the meeting promoter selects the virtual object A as a target to be deleted, in response to the selection request.

If the target to be deleted is selected, then the virtual object setting device 120 transmits information regarding the selection of the virtual object A as the target to be deleted, to the virtual object management device 100 together with a virtual object deletion request at step S220.

Upon receiving the information regarding the selection of the virtual object A as the target to be deleted and the deletion request, the virtual object management device 100 deletes the object information and service information of the virtual object A selected as the target to be deleted at step S224. Then, in response to a deletion end request from the virtual object setting device 120, the virtual object management device 100 transmits a virtual object deletion completion notification to the virtual object setting device 120 at step S232.

The virtual object setting device 120 receives the deletion completion notification and then displays a message indicative of the virtual object A deletion completion at step S232.

Although the deletion of only the virtual object A has been disclosed, the virtual objects B and C can be deleted in the same manner.

Next, a description will be given of the virtual object update. The virtual object update is conducted by the meeting promoter using the virtual object setting device 120. For example, in order to update the virtual object A corresponding to the projector 200, the meeting promoter first moves to an installed position of the projector 200 and then applies a virtual object update command to the virtual object setting device 120.

The virtual object setting device 120 performs steps S302 and S304 in response to the virtual object update command from the meeting promoter. Namely, the virtual object setting device 120 acquires positional information from the positional information acquisition device 66 and transmits the acquired positional information to the virtual object management device 100 together with a virtual object update request.

In response to the update request, the virtual object management device 100 receives the positional information at step S308, and then searches the virtual object management table 400 on the basis of the received positional information to extract the corresponding object information therefrom at step S310. In this case, object information of the virtual object A is extracted due to the fact that the virtual object A exists in the vicinity of the virtual object setting device 120. Subsequently, the virtual object management device 100 draws up a list of virtual objects, including the virtual object A to be updated, on the basis of the extracted object information at step S311 and transmits the drawn-up virtual object list to the virtual object setting device 120 at step S312.

Upon receiving the virtual object list, the virtual object setting device 120 performs step S316. At step S316, the virtual object setting device 120 displays the received virtual object list and requests the meeting promoter to select a virtual object to be updated. In response to the selection request, the meeting promoter selects the virtual object A as a target to be updated and inputs update contents regarding the selected virtual object A.

If the target to be updated is selected and the update contents are inputted, then the virtual object setting device 120 performs steps S324 and S326. At steps S324 and S326, the virtual object setting device 120 generates object information and service information on the basis of the acquired positional information and the results selected and inputted respectively at steps S320 and S322, and then transmits the generated object information and service information to the virtual object management device 100 along with information regarding the selection of the virtual object A as the target to be updated and a virtual object update request.

Upon receiving the information regarding the selection of the virtual object A as the target to be updated and the update request, the virtual object management device 100 receives object information and service information at step S330 and updates the object information and service information of the virtual object A selected as the target to be updated on the basis of the received object information and service information at step S332. Then, in response to an update end request from the virtual object setting device 120, the virtual object management device 100 transmits a virtual object update completion notification to the virtual object setting device 120 at step S340.

The virtual object setting device 120 receives the update completion notification and then displays a message indicative of the virtual object A update completion at step S344.

Although the update of only the virtual object A has been disclosed, the virtual objects B and C can be updated in the same manner.

Thus, in the present embodiment, the virtual object management device 100 is adapted to register object information regarding the shape and disposed position of the virtual object A in a manner corresponding to the projector 200, and object information regarding the shape and disposed position of the virtual object B in a manner corresponding to the portable terminal 140, respectively. The virtual object management device 100 is also adapted to update the disposed position of the virtual object B on the basis of received positional information. Upon determining with reference to the virtual object management table 400 that the virtual object B overlaps with the virtual object A (i.e., the area-in state), the virtual object management device 100 transmits an area-in notification to the projector 200. Upon receiving the area-in notification, the projector 200 transmits a projector display data transmission request to the portable terminal 140 and receives projector display data transmitted in response to the transmission request. The projector 200 then executes a projection process by the projection device 82 on the basis of the received projector display data. The portable terminal 140 transmits positional information acquired from the positional information acquisition device 86 to the virtual object management device 100. The portable terminal 140 can further transmit the projector display data to the projector 200 in response to the projector display data transmission request.

Accordingly, because the virtual objects A and B are created to have their own shapes and disposed positions, and a determination is made as to whether the virtual object B is in the area-in state with respect to the virtual object A, service provision areas can be defined more clearly than those conventionally provided, thereby making it possible to provide different services in respective small unit areas, such as several meters. Further, a projection service provision area (the area of the virtual object A) and an area corresponding to the portable terminal 140 (the area of the virtual object B) are not limited to points, but have predetermined ranges, thereby enabling the presenter to easily receive the projection service. Moreover, the presenter can receive the projection service by merely taking the portable terminal 140 to the area of the virtual object A or the vicinity thereof. As a result, the presenter can relatively easily receive the projection service. Therefore, the projection service using projector display data responsive to the presenter can be provided under the condition that the presenter is uniquely identified to a certain degree.

Further, in the present embodiment, upon receiving the area-in notification, the projector 200 acquires communication object data C from the service linkage management device 240 and executes a communication establishment process on the basis of the acquired communication object data C to transmit the projector display data transmission request to the portable terminal 140.

Accordingly, as long as the service linkage management device 240 is accessible, the projector 200 can provide the projection service even though it does not have the communication object data C, thereby making it possible to additionally provide the projector 200 relatively easily irrespective of the model, number, etc. of the portable terminal 140. Furthermore, in the case where a plurality of portable terminals 140 are present, object data for communication with the portable terminals 140 can be managed in an integrated manner by the service linkage management device 240.

Further, in the present embodiment, the virtual object management device 100 is adapted to determine with reference to the virtual object management table 400 whether the virtual object B is in the area-in state with respect to the virtual object A. Thus, because the area-in state determination is made in the virtual object management device 100, the amount of load to be processed on the portable terminal 140 can be reduced as compared with that when the area-in state determination is made in the portable terminal 140. This is similarly applied to the area-out state determination.

Further, in the present embodiment, the portable terminal 140 is adapted to store projector display data and transmit the stored projector display data. As a result, because the projector display data transmission is conducted in the portable terminal 140, the amount of load to be processed on the virtual object management device 100 can be reduced as compared with that when the projector display data transmission is conducted in the virtual object management device 100.

Further, in the present embodiment, the virtual object management device 100 is adapted to receive input contents regarding object information creation, deletion, or update through communication with the virtual object setting device 120 and create, delete, or update object information on the basis of the received input contents. Accordingly, the virtual object creation, deletion, or update can be easily performed. Therefore, the present invention can relatively flexibly cope with situational variations, such as a movement of the projector 200 in the meeting place, an increase or reduction in the number of the projector 200, and the like.

Next, a second embodiment of the present invention will be described with the reference to the accompanying drawings. FIGS. 22 to 24 are views showing an output service provision system, a virtual object management terminal, a mobile object, a virtual object management terminal program, a mobile object program, and an output service provision method in accordance with the second embodiment of the present invention. Some parts in the second embodiment are substantially the same as those in the first embodiment. Therefore, in the second embodiment, the same parts as those in the first embodiment are denoted by the same reference numerals and a description thereof will be omitted.

In the output service provision system, the virtual object management terminal, the mobile object, the virtual object management terminal program, the mobile object program, and the output service provision method in accordance with the second embodiment of the present invention, as shown in FIG. 22, in a presentation meeting place, a sphere-shaped virtual object A and virtual object B' are disposed and set respectively in an area surrounding a projector 200 and an area surrounding a card 160 used by a presenter by a virtual object setting device 120, and a projection service by the projector 200 is initiated on the basis of projector display data of a card management device 180 when the virtual objects A and B' overlap with each other.

First, the structure of a network system to which the present invention is applied will be described with reference to FIG. 22. FIG. 22 is a view showing the structure of the network system to which the present invention is applied.

In FIG. 22, installed on a wall of the presentation meeting place are a virtual object management device 100, a service linkage management device 240, and the card management device 180 for managing the card 160. The projector 200 and a printer 220 are further installed in the presentation meeting place. The virtual object setting device 120 and the card 160 used by the presenter are also provided in the presentation meeting place.

The virtual object management device 100, the virtual object setting device 120, the card 160, the card management device 180, the projector 200, the printer 220, and the service linkage management device 240 are configured to be communicatable with one another in a wireless communication manner. In detail, the virtual object management device 100 communicates with the virtual object setting device 120, the card 160, the card management device 180, the projector 200, the printer 220, and the service linkage management device 240, and the card 160 communicates with the virtual object management device 100. The card management device 180 communicates with the virtual object management device 100, the projector 200, the printer 220, and the service linkage management device 240, and the projector 200 and the printer 220 communicate with the virtual object management device 100, the card management device 180, and the service linkage management device 240.

Meanwhile, the sphere-shaped virtual object A is set in the area surrounding the projector 200, the sphere-shaped virtual object B' is set in the area surrounding the card 160, and a sphere-shaped virtual object C is set in an area surrounding the printer 220.

The service linkage management device 240 can include a storage unit for storing communication object data for establishment of communications with the virtual object setting device 120, the card management device 180, the projector 200, and the printer 220. The service linkage management device 240 is adapted to read and transmit the communication object data from the storage unit in response to requests from the respective devices. Stored in the storage unit are communication object data A for establishment of communication with the projector 200, communication object data B for establishment of communication with the virtual object setting device 120, communication object data D for establishment of communication with the printer 220, and communication object data E for establishment of communication with the card management device 180.

Next, a detailed description will be given of the structure of the virtual object management device 100.

The virtual object management device 100 can include a virtual object management DB 42 which stores a virtual object management table 400 capable of registering object information regarding the shapes and disposed positions of the virtual objects in a manner corresponding to service information prescribing service contents, as shown in FIG. 23. FIG. 23 is a view showing a data structure of the virtual object management table 400.

The virtual object management table 400 is configured to be capable of registering one record for each of the virtual objects, as shown in FIG. 23. Each record includes a field 402 for registering a serial number, a field 404 for registering a type of a service based on a device such as the projector 200 or etc., a field 406 for registering a service ID specifying the service, a field 408 for registering coordinates indicative of the disposed position of the corresponding virtual object in the virtual space corresponding to the real space, a field 410 for registering the shape of the corresponding virtual object, a field 412 for registering the size of the corresponding virtual object, and a field 414 for registering area-in management information for management of an inter-service linkage.

In the third-stage record in the example of FIG. 23, "3" is registered as the serial number in the field 402, "card service" as the service type in the field 404, "0005" as the service ID in the field 406, "(30,40,20)" as the coordinates in the field 408, "sphere" as the shape in the field 410, and "1[m]" as the size in the field 412, respectively. This third-stage record signifies that the virtual object B' is virtually disposed as a spherical shape having a radius of 1[m] about coordinates (30,40,20) in the real space where the card 160 is present, and a service by the card 160 is carried out in the internal area of the virtual object B' specified by the disposed position and shape. Note that the coordinates in the real space where the card 160 exists are changeable momentarily. In this regard, for the card service, positional information is acquired from the card 160 and the coordinates in the field 408 are updated on the basis of the acquired positional information. For example, in the case where the area of the virtual object A and the area of the virtual object B' overlap with each other, the projector service and the card service are linked to each other, and the projector 200 and the card management device 180 are interoperable with each other.

Further, the virtual object management DB 42 stores a communication information registration table 500 for registering communication information specifying communication object data to be acquired from the service linkage management device 240 for service use with respect to each service to be used, as shown in FIG. 24. FIG. 24 is a view showing an exemplary data structure of the communication information registration table 500.

The communication information registration table 500 is configured to register one record for each service, as shown in FIG. 24. Each record includes a field 502 for registering a service ID, a field 504 for registering a service type, and a field 506 for registering communication information. Notably, the communication information registration table 500 is stored in storage units of not only the virtual object management device 100 but also the card management device 180, projector 200, printer 220, and service linkage management device 240.

Next, a detailed description will be given of the structure of the card 160. The card 160 can include, although not shown, a wireless communication device for communicating with the virtual object management device 100 in a wireless communication manner, and a positional information acquisition device for measuring the current position of the card 160 to acquire positional information specifying the current position. The card 160 is adapted to transmit the positional information acquired from the positional information acquisition device to the virtual object management device 100 at predetermined periods by the wireless communication device. In detail, this process corresponds to the positional information notification process shown in the flow chart of FIG. 19, among the processes executed by the portable terminal 140 in the first embodiment.

Further, the card 160 can include, for example, an internal circuit provided with a coil and a capacitor connected to the coil. An electromagnetic radiator (not shown) installed in the meeting place radiates electromagnetic waves, which are received by the coil and then converted into electric power by electromagnetic induction. The converted electric power is stored in the capacitor and then supplied to the wireless communication device and positional information acquisition device to drive them.

Next, a detailed description will be given of the structure of the card management device 180. The card management device 180 is configured to have the same functions as those of a general computer with a CPU, ROM, RAM, I/F, etc. connected to a bus. The card management device 180 can include a storage unit for storing projector display data of each presenter.

The CPU of the card management device 180 may preferably be a micro processing unit (MPU), etc. which runs a predetermined program stored in a predetermined area of the ROM to execute processes corresponding respectively to the service linkage process and projector display data transmission process shown respectively in the flow charts of FIGS. 20 and 21, among the processes executed by the portable terminal 140 in the first embodiment, in a time division manner.

Additionally, the virtual object management device 100, projector 200, printer 220, and service linkage management device 240 are constructed in a different manner from those in the first embodiment to process the card service instead of the PDA service 2, and the operation associated with the card management device 180 instead of the operation associated with the portable terminal 140. These differences will be clearly understood from the below description of the operation.

Next, the operation of the second embodiment will be described.

First, a description will be given of the case where the presenter gives a presentation using the projector 200. In order to conduct a presentation, the presenter stores projector display data for the presentation in the card management device 180 and moves within the meeting place while carrying the card 160. At this time, the card 160 performs steps S400 and S402. At steps S400 and S402, the card 160 acquires positional information from the positional information acquisition device and transmits the acquired positional information to the virtual object management device 100.

Upon receiving the positional information, the virtual object management device 100 updates the coordinates in the field 408 of the virtual object management table 400 for the card service on the basis of the received positional information at step S406 and notifies the card 160 of a response to the positional information reception at step S408.

Upon receiving the response to the positional information transmission, the card 160 transmits the positional information repeatedly at intervals of a predetermined period of time (for example, about 3 seconds). As a result, the disposed position of the virtual object B' is updated with the movement of the card 160.

Next, in order to conduct the presentation, the presenter brings the card 160 close to the projector 200 under the condition that the virtual objects A to C are set. Accordingly, if the virtual object B' enters the area-in state with respect to the virtual object A, the virtual object management device 100 performs steps S500 to S506. At steps S500 to S506, the virtual object management device 100 reads communication information from the communication information registration table 500 on the basis of service information of the projector 200 and acquires communication object data A from the service linkage management device 240 on the basis of the read communication information. Then, at step S508, the virtual object management device 100 establishes communication with the projector 200 by executing a communication establishment process on the basis of the acquired communication object data A, and notifies the projector 200 of the area-in state.

Upon receiving the area-in notification, the projector 200 recognizes that a service associated with the received area-in notification is the card service, and then performs steps S512 and S514. At steps S512 and S514, the projector 200 reads communication information of the card service from the communication information registration table 500 and acquires communication object data E from the service linkage management device 240 on the basis of the read communication information. Then, at steps S516 and S524, the projector 200 establishes communication with the card management device 180 by executing a communication establishment process on the basis of the acquired communication object data E, and transmits a service linkage initiation request and projector display data transmission request to the card management device 180.

The card management device 180 receives the service linkage initiation request and recognizes that a service associated with the received service linkage initiation request is the projector service. As a result, at step S520, the card management device 180 reads communication information of the projector service from the communication information registration table 500 and acquires communication object data A from the service linkage management device 240 on the basis of the read communication information. Then, at step S522, the card management device 180 establishes communication with the projector 200 by executing a communication establishment process on the basis of the acquired communication object data A, and initiates linkage with the projector service. Upon receiving the projector display data transmission request while the linkage with the projector service is in progress, the card management device 180 reads projector display data designated for the presentation at step S530 and transmits the read projector display data to the projector 200 at step S532.

Upon receiving the projector display data, the projector 200 executes a projection process by the projection device 82 on the basis of the received projector display data at step S536 and notifies the virtual object management device 100 of a response to the area-in notification reception at step S538.

The virtual object management device 100 receives the response to the area-in notification and registers a service ID of the projector service in the area-in management information of the card service at step S542. The virtual object management device 100 then manages the linkage between the card service and the projector service.

Thereafter, in order to finish the presentation, the presenter departs from the projector 200 while carrying the card 160. Accordingly, if the virtual object B' is separated from the virtual object A (i.e., the area-out state), the virtual object management device 100 performs steps S600 to S608. At S600 to S608, the virtual object management device 100 reads communication information from the communication information registration table 500 on the basis of the service information of the projector 200 and acquires communication object data A from the service linkage management device 240 on the basis of the read communication information. Then, at step S610, the virtual object management device 100 establishes communication with the projector 200 by executing a communication establishment process on the basis of the acquired communication object data A, and notifies the projector 200 of the area-out state.

Upon receiving the area-out notification, the projector 200 recognizes that a service associated with the received area-out notification is the card service, and then performs steps S614 and S616. At steps S614 and S616, the projector 200 reads communication information of the card service from the communication information registration table 500 and acquires communication object data E from the service linkage management device 240 on the basis of the read communication information. Then, at step S618, the projector 200 establishes communication with the card management device 180 by executing a communication establishment process on the basis of the acquired communication object data E, and transmits a service linkage termination request to the card management device 180. At step S624, the projector 200 transmits a response to the area-out notification reception to the virtual object management device 100.

Upon receiving the service linkage termination request, the card management device 180 recognizes that a service associated with the received service linkage termination request is the projector service, and then terminates the linkage with the projector service at step S622.

On the other hand, the virtual object management device 100 receives the response to the area-out notification and deletes the service ID of the projector service from the area-in management information of the card service at step S628. The virtual object management device 100 then manages the termination of linkage between the card service and the projector service.

As described above, the projector display data of the card management device 180 is projected by the projector 200 by bringing the card 160 close to the projector 200 to allow the virtual object B' to enter the area-in state with respect to the virtual object A. In a similar manner, the projector display data of the card management device 180 can be printed by the printer 220 by bringing the card 160 close to the printer 220 to allow the virtual object B' to enter the area-in state with respect to the virtual object C.

Further, the virtual object creation, deletion, and update can be performed in the same manner as those in the first embodiment.

As described above, in the present embodiment, the virtual object management device 100 is adapted to register object information regarding the shape and disposed position of the virtual object A in a manner corresponding to the projector 200, and object information regarding the shape and disposed position of the virtual object B' in a manner corresponding to the card 160, respectively. The virtual object management device 100 is also adapted to update the disposed position of the virtual object B' on the basis of received positional information. Upon determining with reference to the virtual object management table 400 that the virtual object B' overlaps with the virtual object A (i.e., the area-in state), the virtual object management device 100 transmits an area-in notification to the projector 200. Upon receiving the area-in notification, the projector 200 transmits a projector display data transmission request to the card management device 180 and receives projector display data transmitted in response to the transmission request. The projector 200 then executes a projection process by the projection device 82 on the basis of the received projector display data. The card 160 transmits positional information acquired from the positional information acquisition device to the virtual object management device 100. The card management device 180 transmits the projector display data to the projector 200 in response to the projector display data transmission request.

Accordingly, because the virtual objects A and B' are created to have their own shapes and disposed positions, and a determination is made as to whether the virtual object B' is in the area-in state with respect to the virtual object A, service provision areas can be defined more clearly than those conventionally provided, thereby making it possible to provide different services in respective small unit areas, such as several meters. Further, a projection service provision area (the area of the virtual object A) and an area corresponding to the card 160 (the area of the virtual object B') are not limited to points, but have predetermined ranges, thereby enabling the presenter to easily receive the projection service. Moreover, the presenter can receive the projection service by merely taking the card 160 to the area of the virtual object A or the vicinity thereof. As a result, the presenter can relatively easily receive the projection service. Therefore, the projection service using projector display data responsive to the presenter can be provided under the condition that the presenter is uniquely identified to a certain degree.

Further, in the present embodiment, upon receiving the area-in notification, the projector 200 acquires communication object data E from the service linkage management device 240 and executes a communication establishment process on the basis of the acquired communication object data E to transmit the projector display data transmission request to the card management device 180.

Accordingly, as long as the service linkage management device 240 is accessible, the projector 200 can provide the projection service even though it does not have the communication object data E, thereby making it possible to additionally provide the projector 200 relatively easily irrespective of the model, number, etc. of the card management device 180. Furthermore, in the case where a plurality of card management devices 180 are present, object data for communication with the card management devices 180 can be managed in an integrated manner by the service linkage management device 240.

Further, in the present embodiment, the virtual object management device 100 is adapted to determine with reference to the virtual object management table 400 whether the virtual object B' is in the area-in state with respect to the virtual object A. Thus, because the area-in state determination is made in the virtual object management device 100, the amount of load to be processed on the card management device 180 can be reduced as compared with that when the area-in state determination is made in the card management device 180. This is similarly applied to the area-out state determination.

Further, in the present embodiment, the card management device 180 is adapted to store projector display data and transmit the stored projector display data. As a result, because the projector display data transmission is conducted in the card management device 180, the amount of load to be processed on the virtual object management device 100 can be reduced as compared with that when the projector display data transmission is conducted in the virtual object management device 100.

Further, in the present embodiment, the virtual object management device 100 is adapted to receive input contents regarding object information creation, deletion, or update through communication with the virtual object setting device 120 and create, delete, or update object information on the basis of the received input contents. Accordingly, the virtual object creation, deletion, or update can be easily performed. Therefore, the present invention can relatively flexibly cope with situational variations, such as a movement of the projector 200 in the meeting place, an increase or reduction in the number of the projector 200, etc.

Further, in the first embodiment, although the virtual object management device 100 has been disclosed to determine with reference to the virtual object management table 400 whether the virtual object B is in the area-in state with reference to the virtual object A, it should be understood that the present invention is not limited thereto. For example, the virtual object management table 400 may be installed in the portable terminal 140, and the portable terminal 140 may make the area-in state determination.

As a result, because the area-in state determination is conducted in the portable terminal 140, the amount of load to be processed on the virtual object management device 100 can be reduced as compared with that when the area-in state determination is conducted in the virtual object management device 100. This is similarly applied to the area-out state determination.

In this case, the virtual object management device 100 corresponds to a virtual object management terminal described in claim 3, the portable terminal 140 corresponds to a mobile object described in claim 3, and the virtual object management DB 42 corresponds to first storage means described in claim 3, or second storage means described in claim 3. Also, the positional information acquisition device 86 corresponds to positional information acquisition means described in claim 3.

Of course, the present invention is not limited thereto. For example, the area-in state determination may be made in the projector 200, printer 220, service linkage management device 240, or any other device.

Further, in the first embodiment, although the portable terminal 140 has been disclosed to transmit the projector display data, the present invention is not limited thereto. For example, the projector display data may be stored in the virtual object management device 100, and the virtual object management device 100 may transmit the projector display data.

Accordingly, the amount of load to be processed on the portable terminal 140 can be reduced owing to the fact that the projector display data transmission is conducted in the virtual object management device 100.

Of course, the present invention is not limited thereto. For example, the projector display data transmission may be made in the projector 200, printer 220, service linkage management device 240, or any other device.

Further, in the second embodiment, although the virtual object management device 100 has been disclosed to determine with reference to the virtual object management table 400 whether the virtual object B' is in the area-in state with reference to the virtual object A, the present invention is not limited thereto. For example, the virtual object management table 400 may be installed in the card management device 180, and the card management device 180 may make the area-in state determination.

As a result, because the area-in state determination is conducted in the card management device 180, the amount of load to be processed on the virtual object management device 100 can be reduced as compared with that when the area-in state determination is conducted in the virtual object management device 100. This is similarly applied to the area-out state determination.

Of course, the present invention is not limited thereto. For example, the area-in state determination may be made in the projector 200, printer 220, service linkage management device 240, or any other device.

Further, in the second embodiment, although the card management device 180 has been disclosed to transmit the projector display data, the present invention is not limited thereto. For example, the projector display data may be stored in the virtual object management device 100, and the virtual object management device 100 may transmit the projector display data.

Accordingly, the amount of load to be processed on the card management device 180 can be reduced owing to the fact that the projector display data transmission is conducted in the virtual object management device 100.

Of course, the present invention is not limited thereto. For example, the projector display data transmission may be made in the projector 200, printer 220, service linkage management device 240, or any other device.

Further, in the first and second embodiments, although the virtual object management device 100 and the service linkage management device 240 have been disclosed to be individually installed, the present invention is not limited thereto. For example, the virtual object management device 100 and the service linkage management device 240 may be integrated with each other to constitute a single device.

Further, in the second embodiment, although the card 160 has been disclosed to transmit the positional information acquired from the positional information acquisition device to the virtual object management device 100, the present invention is not limited thereto. For example, the card 160 may transmit the positional information acquired from the positional information acquisition device to the card management device 180, and the card management device 180 may receive the positional information transmitted from the card 160 and transmit the received positional information to the virtual object management device 100. Also, the present invention is not limited to the acquisition of the self-positional information by the card 160. For example, the card management device 180 may measure the positional information of the card 160.

Further, in the second embodiment, although the projection service and print service have been disclosed to be provided through the use of the card 160, the present invention is not limited thereto. For example, any other portable object carryable by the presenter may be used to provide the projection service and print service.

Further, in the first and second embodiments, although the object information and service information have been disclosed to be transmitted and received in a wireless communication manner, it should be understood that the present invention is not limited thereto. For example, the object information and service information may be transmitted and received over a network, or they may be stored in a storage medium, such as an IC card chip, two-dimensional barcode or the like, and transmitted and received via the storage medium.

Further, in the first embodiment, although the portable terminal 140 has been disclosed to pre-store the program for execution of the processes shown in the flow charts of FIGS. 19 to 21, it should be understood that the present invention is not limited thereto. For example, the portable terminal 140 may not have such a program, the virtual object management device 100 may transmit object information with the program contained therein, and the portable terminal 140 may interpret the object information and service information according to the execution of the received program by applying only positional information to the program.

Accordingly, a new service can be received by merely modifying the program of the virtual object management device 100 with no necessity for modifying the internal settings of the portable terminal 140.

Further, in the second embodiment, although the card management device 180 has been disclosed to pre-store the program for execution of the processes shown in the flow charts of FIGS. 20 and 21, it should be understood that the present invention is not limited thereto. For example, the card management device 180 may not have such a program, the virtual object management device 100 may transmit object information with the program contained therein, and the card management device 180 may interpret the object information and service information according to the execution of the received program by applying only positional information to the program.

Accordingly, a new service can be received by merely modifying the program of the virtual object management device 100 with no necessity for modifying the internal settings of the card management device 180.

Further, in the first and second embodiments, although the object information and the service information have been disclosed to be stored in the virtual object management device 100, it should be understood that the present invention is not limited thereto. For example, the object information and the service information may be stored respectively in different devices, and the virtual object management device 100 may store only access information (for example, shortcut information) for access to the object information and service information. The portable terminal 140 or card management device 180 may acquire the access information from the virtual object management device 100 and obtain the object information and service information on the basis of the access information.

Further, in the first and second embodiments, although the control program pre-stored in the ROM 32 has been disclosed to be run to execute the processes shown in the flow charts of FIGS. 5 to 10, the present invention is not limited thereto. For example, a program indicative of the sequence of those processes may be stored in a storage medium, read from the storage medium out to the RAM 34 and then run.

Further, in the first and second embodiments, although the control program pre-stored in the ROM 52 has been disclosed to be run to execute the processes shown in the flow charts of FIGS. 12 to 14, the present invention is not limited thereto. For example, a program indicative of the sequence of those processes may be stored in a storage medium, read from the storage medium out to the RAM 54 and then run.

Further, in the first and second embodiments, although the control program pre-stored in the ROM 72 has been disclosed to be run to execute the processes shown in the flow charts of FIGS. 16 and 17, the present invention is not limited thereto. For example, a program indicative of the sequence of those processes may be stored in a storage medium, read from the storage medium out to the RAM 74 and then run.

Further, in the first embodiment, although the control program pre-stored in the ROM 92 has been disclosed to be run to execute the processes shown in the flow charts of FIGS. 19 to 21, the present invention is not limited thereto. For example, a program indicative of the sequence of those processes may be stored in a storage medium, read from the storage medium out to the RAM 94 and then run.

Further, in the second embodiment, although the control program prestored in the ROM of the card management device 180 has been disclosed to be run to execute the processes shown in the flow charts of FIGS. 20 and 21, the present invention is not limited thereto. For example, a program indicative of the sequence of those processes may be stored in a storage medium, read from the storage medium out to the RAM of the card management device 180 and then run.

Here, the storage medium may be a semiconductor storage medium, such as a RAM, ROM, or the like, a magnetic recording-type storage medium, such as an FD, HD, or the like, an optical read-type storage medium, such as a CD, CDV, LD, DVD, or the like, or a magnetic recording/optical read-type storage medium, such as an MO. That is, the storage medium may be any computer-readable storage medium irrespective of an electronic reading method, magnetic reading method, optical reading method, etc.

Further, in the first embodiment, although the output service provision system, virtual object management terminal, mobile object, virtual object management terminal program, mobile object program, and output service provision method have been applied to the case where, as shown in FIG. 1, in the presentation meeting place, the sphere-shaped virtual object A and virtual object B are disposed and set respectively in the area surrounding the projector 200 and the area surrounding the portable terminal 140 used by the presenter by the virtual object setting device 120, and the projection service by the projector 200 is initiated on the basis of projector display data of the portable terminal 140 when the virtual objects A and B overlap with each other, the present invention is not limited thereto. For example, the output service provision system, virtual object management terminal, mobile object, virtual object management terminal program, mobile object program, and output service provision method may also be applied to a different case without departing from the scope and spirit of the invention.

Further, in the second embodiment, although the output service provision system, virtual object management terminal, mobile object, virtual object management terminal program, mobile object program, and output service provision method have been applied to the case where, as shown in FIG. 22, in the presentation meeting place, the sphere-shaped virtual object A and virtual object B' are disposed and set respectively in the area surrounding the projector 200 and the area surrounding the card 160 used by the presenter by the virtual object setting device 120, and the projection service by the projector 200 is initiated on the basis of projector display data of the card management device 180 when the virtual objects A and B' overlap with each other, the present invention is not limited thereto. For example, the output service provision system, virtual object management terminal, mobile object, virtual object management terminal program, mobile object program, and output service provision method may also be applied to a different case without departing from the scope and spirit of the invention.

As apparent from the above description, according to an output service provision system of the present invention, virtual objects are created to have their own shapes and disposed positions, and a determination is made as to whether an area of the first virtual object and an area of the second virtual object overlap with each other. Therefore, output service provision areas can be defined more clearly than those conventionally provided, thereby making it possible to provide different output services in respective small unit areas, such as several meters. Further, an output service provision area and an area corresponding to a mobile object are not limited to points, but have predetermined ranges, thereby enabling a user to easily receive an output service. Moreover, the user can receive the output service by merely taking the mobile object to the area of the first virtual object or the vicinity thereof. As a result, the user can relatively easily receive the output service. Therefore, an output service responsive to the user can be provided under the condition that the user is uniquely identified to a certain degree.

Further, according to the output service provision system of the present invention, the overlap determination is made in a virtual object management terminal, resulting in a reduction in the amount of load to be processed on the mobile object.

Further, according to the output service provision system of the present invention, the overlap determination is made in the mobile object, resulting in a reduction in the amount of load to be processed on the virtual object management terminal.

Further, according to the output service provision system of the present invention, the transmission of output data is performed in the virtual object management terminal, resulting in a reduction in the amount of load to be processed on the mobile object. Moreover, an output service using output data responsive to the user can be provided.

Further, according to the output service provision system of the present invention, the transmission of output data is performed in the mobile object, resulting in a reduction in the amount of load to be processed on the virtual object management terminal. Moreover, an output service using output data responsive to the user can be provided.

Further, according to an output service provision system of the present invention, virtual objects are created to have their own shapes and disposed positions, and a determination is made as to whether an area of the first virtual object and an area of the second virtual object overlap with each other. Therefore, output service provision areas can be defined more clearly than those conventionally provided, thereby making it possible to provide different output services in respective small unit areas, such as several meters. Further, an output service provision area and an area corresponding to a portable terminal are not limited to points, but have predetermined ranges, thereby enabling a user to easily receive an output service. Moreover, the user can receive the output service by merely taking the portable terminal to the area of the first virtual object or the vicinity thereof. As a result, the user can relatively easily receive the output service. Therefore, an output service using output data responsive to the user can be provided under the condition that the user is uniquely identified to a certain degree.

Further, according to the output service provision system of the present invention, an output device can provide an output service even though it does not have means for establishment of communication with the portable terminal, as long as it can gain access to a communication service provision terminal, thereby making it possible to additionally provide the output device relatively easily irrespective of the model, number, etc. of the portable terminal. Furthermore, in the case where a plurality of portable terminals is present, means for establishment of communication with the portable terminals can be managed in an integrated manner by the communication service provision terminal.

Further, according to an output service provision system of the present invention, virtual objects are created to have their own shapes and disposed positions, and a determination is made as to whether an area of the first virtual object and an area of the second virtual object overlap with each other. Therefore, output service provision areas can be defined more clearly than those conventionally provided, thereby making it possible to provide different output services in respective small unit areas, such as several meters. Further, an output service provision area and an area corresponding to a portable object are not limited to points, but have predetermined ranges, thereby enabling a user to easily receive an output service. Moreover, the user can receive the output service by merely taking the portable object to the area of the first virtual object or the vicinity thereof. As a result, the user can relatively easily receive the output service. Therefore, an output service using output data responsive to the user can be provided under the condition that the user is uniquely identified to a certain degree.

Further, according to the output service provision system of the present invention, an output device can provide an output service even though it does not have means for establishment of communication with a portable object management terminal, as long as it can gain access to a communication service provision terminal, thereby making it possible to additionally provide the output device relatively easily irrespective of the model, number, etc. of the portable object management terminal. Furthermore, in the case where a plurality of portable object management terminals is present, means for establishment of communication with the portable object management terminals can be managed in an integrated manner by the communication service provision terminal.

Further, according to the output service provision system of the present invention, the first virtual object can be easily created, deleted, or updated. Therefore, the output service provision system of the present invention can relatively flexibly cope with situational variations, as being applied to a new object, such as a building, or an object with a temporary location, such as an exhibit.

Further, according to the output service provision system of the present invention, the provision of a display service by a projection-type display device can be relatively easily received and a display service responsive to the user can be provided.

Further, according to an output service provision system of the present invention, a user can receive an output service by merely taking a mobile object to an area of a first virtual object or the vicinity thereof. As a result, the user can relatively easily receive the output service. Therefore, an output service using output data responsive to the user can be provided under the condition that the user is uniquely identified to a certain degree. Moreover, the first virtual object can be easily created, deleted, or updated. Therefore, the output service provision system of the present invention can relatively flexibly cope with situational variations, as being applied to a new object, such as a building, or an object with a temporary location, such as an exhibit.

Further, according to an output service provision system of the present invention, a virtual object is created to have its shape and disposed position, and a determination is made as to whether a portable terminal exists in an internal area of the virtual object. Therefore, output service provision areas can be defined more clearly than those conventionally provided, thereby making it possible to provide different output services in respective small unit areas, such as several meters. Moreover, an output service provision area is not limited to a point, but has a predetermined range, thereby enabling a user to easily receive an output service. Moreover, the user can receive the output service by merely taking the portable terminal to the area of the virtual object. As a result, the user can relatively easily receive the output service. Therefore, an output service using output data responsive to the user can be provided under the condition that the user is uniquely identified to a certain degree.

Further, according to an output service provision system of the present invention, a virtual object is created to have its shape and disposed position, and a determination is made as to whether a portable object exists in an internal area of the virtual object. Therefore, output service provision areas can be defined more clearly than those conventionally provided, thereby making it possible to provide different output services in respective small unit areas, such as several meters. Moreover, an output service provision area is not limited to a point, but has a predetermined range, thereby enabling a user to easily receive an output service. Moreover, the user can receive the output service by merely taking the portable object to the area of the virtual object. As a result, the user can relatively easily receive the output service. Therefore, an output service using output data responsive to the user can be provided under the condition that the user is uniquely identified to a certain degree.

On the other hand, according to a virtual object management terminal of the present invention, the same effect as that of the output service provision system described above can be obtained.

And, according to a mobile object of the present invention, the same effect as that of the output service provision system described above can be obtained.

And, according to a virtual object management terminal program of the present invention, the same effect as that of the virtual object management terminal described above can be obtained.

And, according to a mobile object program of the present invention, the same effect as that of the mobile object described above can be obtained.

And, according to an output service provision method of the present invention, the same effect as that of the output service provision system described above can be obtained.

And, according to an output service provision method of the present invention, the same effect as that of the output service provision system described above can be obtained.

What is claimed is:

1. An output service provision system that provides an output service associated with an output of an output device corresponding to a first virtual object in a virtual space corresponding to a real space on the basis of a positional relation between the first virtual object and a second virtual object corresponding to a mobile device that is arranged at a position of said mobile object in said virtual space or the vicinity thereof, the output service provision system comprising:

a first storage device that stores first object information regarding a shape and disposed position of said first virtual object in a manner corresponding to said output device;

a second storage device that stores second object information regarding a shape and disposed position of said second virtual object in a manner corresponding to said mobile object; and a positional information acquisition device that acquires positional information specifying the position of said mobile object;

said second object information in said second storage device being updated on the basis of said positional information acquired by said positional information acquisition device, and providing said output service associated with the output of said output device corresponding to said first virtual object upon determining, on the basis of said first object information in said first storage device and said second object information in said second storage device, that an area specified by said shape and disposed position of said first virtual object is overlapped with an area specified by said shape and disposed position of said second virtual object.

2. The output service provision system as set forth in claim 1, a virtual object management terminal for managing said virtual object being connected with said mobile object in a communicatable manner;

said mobile object including said positional information acquisition device, and being adapted to transmit said positional information acquired from said positional information acquisition device to said virtual object management terminal; and said virtual object management terminal including said first storage device and second storage device, and being adapted to, upon receiving said positional information, update said second object information in said second storage device on the basis of the received positional information, and to determine, on the basis of said first object information in said first storage device and said second object information in said second storage device, whether said area specified by said shape and disposed position of said first virtual object is overlapped with said area specified by said shape and disposed position of said second virtual object.

3. The output service provision system as set forth in claim 2, further comprising an output data storage device that stores output data, which is transmitted to said output device, in a manner corresponding to said mobile object; and said virtual object management terminal being adapted to transmit output data corresponding to said mobile object as said second virtual object, among said output data in said output data storage device, to said output device as said first virtual object if it is determined that said area specified by said shape and disposed position of said first virtual object is overlapped with said area specified by said shape and disposed position of said second virtual object.

4. The output service provision system as set forth in claim 2, further comprising an output data storage device that stores output data, which is transmitted to said output device, in a manner corresponding to said mobile object; and said mobile object being adapted to transmit output data corresponding to said mobile object as said second virtual object, among said output data in said output data storage device, to said output device as said first virtual object if it is determined that said area specified by said shape and disposed position of said first virtual object is overlapped with said area specified by said shape and disposed position of said second virtual object.

5. The output service provision system as set forth in claim 2, said virtual object management terminal further including:

an input device that receives input contents regarding at least one of creation, deletion, and update of said first object information; and an object information processing device that creates, deletes, and updates said first object information on the basis of said input contents received by said input device.

6. A virtual object management terminal communicatably connected with the mobile object in the output service provision system as set forth in claim 2, comprising:

a first storage device that stores said first object information in a manner corresponding to said output device; and a second storage device that stores said second object information in a manner corresponding to said mobile object;

said second object information in said second storage device being updated on the basis of said positional information upon receiving said positional information, and providing the determination, on the basis of said first object information in said first storage device and said second object information in said second storage, whether said area specified by said shape and disposed position of said first virtual object is overlapped with said area specified by said shape and disposed position of said second virtual object.

7. A virtual object management terminal program run in the virtual object management terminal, as a computer, as set forth in claim 6, the virtual object management terminal program comprising:

a process of updating said second object information in said second storage device on the basis of said positional information upon receiving said positional information; and a process of determining, on the basis of said first object information in said first storage device and said second object information in said second storage device, whether said area specified by said shape and disposed position of said first virtual object is overlapped with said area specified by said shape and disposed position of said second virtual object.

8. The output service provision system as set forth in claim 1, a virtual object management terminal for managing said virtual object being connected with said mobile object in a communicatable manner;

said virtual object management terminal including said first storage device, and being adapted to transmit said first object information in said first storage device to said mobile object; and said mobile object including said second storage device and positional information acquisition device, and being adapted to update said second object information in said second storage device on the basis of said positional information acquired from said positional information acquisition device, and to, upon receiving said first object information, determine, on the basis of the received first object information and said second object information in said second storage device, whether said area specified by said shape and disposed position of said first virtual object is overlapped with said area specified by said shape and disposed position of said second virtual object.

9. A mobile object communicatably connected with the virtual object management terminal in the output service provision system as set forth in claim 8, comprising:

a second storage device that stores said second object information in a manner corresponding to the mobile object; and a positional information acquisition device that acquires positional information specifying the position of the mobile object;

said second object information in said second storage device being updated on the basis of said positional information acquired from said positional information acquisition device and, upon receiving said first object information, and providing the determination, on the basis of the received first object information and said second object information in said second storage device, whether said area specified by said shape and disposed position of said first virtual object is overlapped with said area specified by said shape and disposed position of said second virtual object.

10. A mobile object program run in the mobile object, as a computer, as set forth in claim 9, the mobile object program comprising:

a process of updating said second object information in said second storage device on the basis of said positional information acquired from said positional information acquisition device; and a process of determining, upon receiving said first object information, on the basis of the received first object information and said second object information in said second storage device, whether said area specified by said shape and disposed position of said first virtual object is overlapped with said area specified by said shape and disposed position of said second virtual object.

11. The output service provision system as set forth in claim 1, said output device being a projection-type display device.

12. An output service provision system for interconnecting a virtual object management terminal managing virtual objects, an output device, and a portable terminal in a communicatable manner, allowing a first virtual object corresponding to said output device and allowing a second virtual object corresponding to said portable terminal, respectively, arranging said first virtual object in a virtual space corresponding to a real space and arranging said second virtual object at a position of said portable terminal in virtual space or the vicinity thereof, respectively, and providing an output service associated with an output of said output device corresponding to said first virtual object on the basis of a positional relation between said first virtual object and said second virtual object, the output service provision system comprising:

a positional information acquisition device that acquires positional information specifying the position of said portable terminal;

said virtual object management terminal including a first storage device that stores first object information regarding a shape and disposed position of said first virtual object in a manner corresponding to said output device, and a second storage device that stores second object information regarding a shape and disposed position of said second virtual object in a manner corresponding to said portable terminal, and is adapted to update said second object information in said second storage device on the basis of said positional information acquired by said positional information acquisition device, and transmit a provision request to provide said output service associated with the output of said output device corresponding to said first virtual object, upon determining, on the basis of said first object information in said first storage device and said second object information in said second storage device, that an area specified by said shape and disposed position of said first virtual object is overlapped with an area specified by said shape and disposed position of said second virtual object;

said portable terminal including an output data storage device that stores output data, which is transmitted to said output device, and is adapted to, upon receiving said provision request, transmit said output data in said output data storage device to said output device associated with the received provision request; and said output device being adapted to, upon receiving said output data, provide output on the basis of the received output data.

13. The output service provision system as set forth in claim 12, said portable terminal being connected with a communication service provision terminal in a communicatable manner, said communication service provision terminal providing a service for communication with said portable terminal;

said communication service provision terminal including a constituent information storage device for storing communication establishment device constituent information, said constituent information constituting communication establishment means for establishing communication with said portable terminal;

said virtual object management terminal being adapted to transmit said provision request to said output device corresponding to said first virtual object upon determining that said area specified by said shape and disposed position of said first virtual object is overlapped with said area specified by said shape and disposed position of said second virtual object;

said output device being adapted to, upon receiving said provision request, acquire said communication establishment means constituent information from said communication service provision terminal, constitute said communication establishment device on the basis of the acquired communication establishment means constituent information, and transmit the provision request to said portable terminal associated with said received provision request on the basis of the constituted communication establishment device; and said portable terminal being adapted to, upon receiving said provision request, transmit said output data in said output data storage device to said output device associated with the received provision request.

14. An output service provision system for interconnecting a virtual object management terminal managing virtual objects, an output device, and a portable object management terminal managing a portable object in a communicatable manner, allowing a first virtual objects corresponding to said output device and allowing a second virtual objects corresponding to said portable object, respectively, arranging said first virtual object in a virtual space corresponding to a real space and arranging said second virtual object at a position of said portable object in said virtual space or the vicinity thereof, respectively, and providing an output service associated with an output of said output device corresponding to said first virtual object on the basis of a positional relation between said first virtual object and said second virtual object, the output service provision system comprising:

a positional information acquisition device that acquires positional information specifying the position of said portable object;

said virtual object management terminal including a first storage device that stores first object information regarding a shape and disposed position of said first virtual object in a manner corresponding to said output device, and a second storage device that stores second object information regarding a shape and disposed position of said second virtual object in a manner corresponding to said portable object, and is adapted to update said second object information in said second storage device on the basis of said positional information acquired by said positional information acquisition device, and transmits a provision request to provide said output service associated with the output of said output device corresponding to said first virtual object, upon determining, on the basis of said first object information in said first storage device and said second object information in said second storage device, that an area specified by said shape and disposed position of said first virtual object is overlapped with an area specified by said shape and disposed position of said second virtual object;

said portable object management terminal including an output data storage device that stores output data, which is transmitted to said output device, in a manner corresponding to said portable object, and is adapted to, upon receiving said provision request, transmit output data corresponding to said portable object associated with the received provision request, among said output data in said output data storage device, to said output device associated with the received provision request; and said output device being adapted to, upon receiving said output data, provide output on the basis of the received output data.

15. The output service provision system as set forth in claim 14, said portable object management terminal being connected with a communication service provision terminal in a communicatable manner, said communication service provision terminal providing a service for communication with said portable object management terminal;

said communication service provision terminal including a constituent information storage device that stores communication establishment means constituent information, said constituent information constituting communication establishment means for establishing communication with said portable object management terminal;

said virtual object management terminal being adapted to transmit said provision request to said output device corresponding to said first virtual object upon determining that said area specified by said shape and disposed position of said first virtual object is overlapped with said area specified by said shape and disposed position of said second virtual object;

said output device being adapted to, upon receiving said provision request, acquire said communication establishment means constituent information from said communication service provision terminal, constitute said communication establishment device on the basis of the acquired communication establishment means constituent information, and transmit the provision request to said portable object management terminal associated with said received provision request on the basis of the constituted communication establishment means; and said portable object management terminal being adapted to, upon receiving said provision request, transmit said output data corresponding to said portable object associated with the received provision request, among said output data in said output data storage device, to said output device associated with the received provision request.

16. An output service provision system that provides an output service associated with an output of an output device corresponding to a first virtual object that is arranged on the basis of a positional relation between the first virtual object and a second virtual object, corresponding to a mobile device that is arranged at a position of said mobile object in said virtual space or the vicinity thereof, the output service provision system comprising:

a first storage device that stores first object information regarding said first virtual object in a manner corresponding to said output device;

a second storage device that stores second object information regarding said second virtual object in a manner corresponding to said mobile object;

said output service associated with the output of said output device corresponding to said first virtual object being provided, upon determining on the basis of said first object information in said first storage device and said second object information in said second storage device, that said positional relation between said first virtual object and said second virtual object satisfies a predetermined condition;

an input device that receives input contents regarding creation, deletion, or update of said first object information; and an object information processing device that creates, deletes or updates said first object information on the basis of said input contents received by said input device.

17. An output service provision system for interconnecting a virtual object management terminal managing a virtual object, an output device, and a portable terminal in a communicatable manner, allowing said virtual object in a manner corresponding to said output device, arranging said virtual object in a virtual space corresponding to a real space, and providing an output service associated with an output of said output device corresponding to said virtual object on the basis of a positional relation between said portable terminal and said virtual object, the output service provision system comprising:

a positional information acquisition device that acquires positional information specifying the position of said portable terminal;

said virtual object management terminal including an object information storage device that stores object information regarding a shape and disposed position of said virtual object in a manner corresponding to said output device, and is adapted to transmit a provision request to provide said output service associated with the output of said output device corresponding to said virtual object, upon determining, on the basis of said positional information acquired by said positional information acquisition device and said object information in said object information storage device, that said portable terminal exists in an internal area of said virtual object specified by said shape and disposed position of said virtual object;

said portable terminal including an output data storage device that stores output data, which is transmitted to said output device, and is adapted to, upon receiving said provision request, transmit said output data in said output data storage device to said output device associated with the received provision request; and said output device being adapted to, upon receiving said output data, provide its output on the basis of the received output data.

18. An output service provision system for interconnecting a virtual object management terminal managing a virtual object, an output device, and a portable object management terminal managing a portable object in a communicatable manner, allowing said virtual object in a manner corresponding to said output device, arranging said virtual object in a virtual space corresponding to a real space, and providing an output service associated with an output of said output device corresponding to said virtual object on the basis of a positional relation between said portable object and said virtual object, the output service provision system comprising:

a positional information acquisition device that acquires positional information specifying the position of said portable object;

said virtual object management terminal including an object information storage device that stores object information regarding a shape and disposed position of said virtual object in a manner corresponding to said output device, and is adapted to transmit a provision request to provide said output service associated with the output of said output device corresponding to said virtual object, upon determining, on the basis of said positional information acquired by said positional information acquisition device and said object information in said object information storage device, that said portable object exists in an internal area of said virtual object specified by said shape and disposed position of said virtual object; and said portable object management terminal including an output data storage device that stores output data to said output device in a manner corresponding to said portable object, and is adapted to, upon receiving said provision request, transmit output data corresponding to said portable object associated with the received provision request, among said output data in said output data storage device, to said output device associated with the received provision request.

19. An output service provision method that provides an output service associated with an output of an output device corresponding to a first virtual object that is arranged in a virtual space corresponding to a real space on the basis of a positional relation between said first virtual object and a second virtual object corresponding to a mobile device that is arranged at a position of said mobile object in said virtual space or the vicinity thereof, the output service provision method comprising:

storing first object information regarding a shape and disposed position of said first virtual object in a first storage device in a manner corresponding to said output device;

storing second object information regarding a shape and disposed position of said second virtual object in a second storage device in a manner corresponding to said mobile object; and acquiring positional information specifying the position of said mobile object;

updating said second object information in said second storage device on the basis of said positional information acquired at said positional information acquisition step;

determining, on the basis of said first object information in said first storage device and said second object information in said second storage device, whether an area specified by said shape and disposed position of said first virtual object is overlapped with an area specified by said shape and disposed position of said second virtual object; and providing said output service associated with the output of said output device corresponding to said first virtual object if the result of determination at said overlap determination step is overlap.

20. An output service provision method that provides an output service associated with an output of an output device corresponding to said first virtual object that is arranged in a virtual space corresponding to a real space on the basis of a positional relation between the first virtual object and a second virtual object corresponding to a mobile device that is arranged at a position of said mobile object in said virtual space or the vicinity thereof, the output service provision method comprising:

storing first object information regarding said first virtual object in first storage device in a manner corresponding to said output device;

storing second object information regarding said second virtual object in second storage device in a manner corresponding to said mobile object;

determining, on the basis of said first object information in said first storage device and said second object information in said second storage device, whether said positional relation between said first virtual object and said second virtual object satisfies a predetermined condition;

providing said output service associated with the output of said output device corresponding to said virtual object if the result of determination at said positional relation determination step is that said predetermined condition is satisfied;

receiving input contents regarding creation, deletion, or update of said first object information; and creating, deleting, or updating said first object information on the basis of said input contents at said input step.

\* \* \* \* \*